(12) United States Patent
Liu et al.

(10) Patent No.: US 11,552,547 B2
(45) Date of Patent: Jan. 10, 2023

(54) RESONANT SWITCHING POWER CONVERTER

(71) Applicant: Richtek Technology Corporation, Zhubei (TW)

(72) Inventors: Kuo-Chi Liu, Hsinchu (TW); Ta-Yung Yang, Taoyuan (TW); Chung-Lung Pai, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 98 days.

(21) Appl. No.: 17/325,778

(22) Filed: May 20, 2021

(65) Prior Publication Data
US 2021/0399621 A1   Dec. 23, 2021

Related U.S. Application Data

(60) Provisional application No. 63/041,135, filed on Jun. 19, 2020.

(30) Foreign Application Priority Data

Nov. 5, 2020   (TW) .................................. 109138681

(51) Int. Cl.
  *H02M 1/00*   (2006.01)
  *H02M 3/335*   (2006.01)
(52) U.S. Cl.
  CPC ..... *H02M 1/0058* (2021.05); *H02M 3/33584* (2013.01)

(58) Field of Classification Search
  CPC .. H02M 1/0058; H02M 3/33584; H02M 3/01; H02M 3/072; H02M 1/0095; H02M 3/00; H02M 3/158; Y02B 70/10
  See application file for complete search history.

(56) References Cited

U.S. PATENT DOCUMENTS

| | | | |
|---|---|---|---|
| 9,313,840 B2 * | 4/2016 | Grisamore | ........ H02M 3/33523 |
| 9,831,776 B1 | 11/2017 | Jiang | |
| 9,837,907 B1 * | 12/2017 | Babazadeh | ........... H02M 3/158 |
| 9,917,517 B1 * | 3/2018 | Jiang | ...................... H02M 1/34 |
| 2009/0097280 A1 | 4/2009 | Wu et al. | |
| 2011/0175591 A1 * | 7/2011 | Cuk | ...................... H02M 3/158 |
| | | | 323/311 |
| 2021/0184571 A1 * | 6/2021 | Sblano | .................. H02M 3/077 |

* cited by examiner

*Primary Examiner* — Shawki S Ismail
*Assistant Examiner* — Htet Z Kyaw
(74) *Attorney, Agent, or Firm* — Tung & Associates

(57) ABSTRACT

A resonant switching power converter includes: at least one capacitor; switches coupled to the at least one capacitor; at least one charging inductor; at least one discharging inductor; and a zero current estimation circuit. The switches switch electrical connection relationships of capacitors according to an operation signal. The zero current estimation circuit estimates a time point at which a charging resonant current is zero during a charging process and/or estimate a time point at which a discharging resonant current is zero during at least one discharging process according to voltage differences across two ends of the charging inductor and/or the discharging inductor, so as to correspondingly generate a zero current estimation signal. The zero current estimation signal is adopted to generate the operation signal.

30 Claims, 19 Drawing Sheets

RESONANT SWITCHING POWER CONVERTER

CROSS REFERENCE

The present invention claims priority to U.S. 63/041,135 filed on Jun. 19, 2020 and claims priority to TW 109138681 filed on Nov. 5, 2020.

BACKGROUND OF THE INVENTION

Field of Invention

The present invention relates to a resonant switching power converter; particularly, it relates to such resonant switching power converter which is capable of estimating a time point at which zero current occurs.

Description of Related Art

Please refer to FIG. 1, which shows a schematic diagram of a conventional power converter. Under a charging operation, switches Q1, Q2, Q3 and Q4 are ON, whereas, switches Q5, Q6, Q7, Q8, Q9 and Q10 are OFF, so that a series connection of a capacitor C1, a capacitor C2 and a capacitor C3 is formed between an input voltage Vin and an output voltage Vout. On the other hand, under a discharging operation, switches Q5, Q6, Q7, Q8, Q9 and Q10 are ON, whereas, switches Q1, Q2, Q3 and Q4 are OFF, so that a parallel connection of the capacitor C1, the capacitor C2 and the capacitor C3 is formed between the ground voltage level and the output voltage Vout. The capacitors of such conventional power converter will suffer high inrush current when the switches Q1-Q10 are switching.

In view of the above, to overcome the drawback in the prior art, the present invention proposes an innovated power converter.

SUMMARY OF THE INVENTION

From one perspective, the present invention provides a resonant switching power converter, which is configured to operably convert an input voltage to an output voltage; the resonant switching power converter comprising: at least one capacitor; a plurality of switches, which are coupled to the at least one capacitor, wherein the plurality of switches are configured to operably switch electrical connection relationships of the at least one capacitor according to an operation signal; at least one charging inductor, which is connected in series to one of the at least one capacitor; at least one discharging inductor, which is connected in series to one of the at least one capacitor; and a zero current estimation circuit, which is coupled to one or more of (1)-(3): (1) the at least one charging inductor, (2) the at least one discharging inductor, and (3) the at least one capacitor, wherein the zero current estimation circuit is configured to operably estimate a time point at which a charging resonant current is zero during a charging process and/or estimate a time point at which a discharging resonant current is zero during at least one discharging process according to one or more of (a)-(c): (a) a voltage difference across two ends of the at least one charging inductor, (b) a voltage difference across two ends of the at least one discharging inductor, and (c) a voltage difference across two ends of the at least one capacitor, so as to generate a zero current estimation signal, wherein the operation signal is generated according to the zero current estimation signal generate the operation signal; wherein the operation signal includes a charging operation signal and at least one discharging operation signal, wherein the charging operation signal and the at least one discharging operation signal have respective ON periods which do not overlap one another, so that the charging process and the at least one discharging process do not overlap each other; wherein in the charging process, the charging operation signal is configured to operably control the switching of the plurality of switches, so that a series connection of the at least one capacitor and the at least one charging inductor is formed between the input voltage and the output voltage, to form a charging path, whereby a resonant charging operation is performed on the at least one capacitor and the at least one charging inductor; wherein in the at least one discharging process, the at least one discharging operation signal is configured to operably control the switching of the plurality of switches, so that a series connection of each respective capacitor and one of the at least one discharging inductor is formed between the output voltage and a ground voltage level, to simultaneously or sequentially forms a plurality of discharging paths, whereby a resonant discharging operation is performed on the at least one capacitor and the at least one discharging inductor; wherein the charging process and the at least one discharging processes are arranged in a repeated, alternating manner, so as to convert the input voltage to the output voltage.

In one embodiment, the zero current estimation circuit includes: a voltage detection circuit, which is configured to operably generate a voltage detection signal according to the voltage difference across the two ends of the at least one charging inductor and/or the voltage difference across the two ends of the at least one discharging inductor, wherein the voltage detection signal is indicative of a positive voltage period wherein the voltage difference across two ends of the at least one charging inductor and/or the voltage difference across two ends of the at least one discharging inductor is above zero voltage; and a timer, which is coupled to an output end of the voltage detection circuit and which is configured to operably generate the zero current estimation signal according to the voltage detection signal.

In one embodiment, the zero current estimation circuit includes: a voltage detection circuit, which is configured to operably generate a voltage detection signal according to the voltage difference across two ends of the at least one capacitor, wherein the voltage detection signal is indicative of an occurrence time point of a peak of the voltage difference across the two ends of the at least one capacitor and an occurrence time point of a valley of the voltage difference across the two ends of the at least one capacitor, and wherein the zero current estimation signal is generated according to the voltage detection signal.

In one embodiment, the timer includes: a ramp circuit, which is configured to operably generate a rising ramp of a ramp signal according to the voltage detection signal during the positive voltage period, and to operably generate a falling ramp of the ramp signal according to the rising ramp after the positive voltage period ends; and a comparison circuit, which is configured to operably compare the ramp signal with a zero current threshold, so as to generate the zero current estimation signal for determining a starting time point and an ending time point of the charging process and a starting time point and an ending time point of the at least one discharging processes.

In one embodiment, the ramp circuit includes: a voltage increasing circuit, which is configured to operably increase a voltage across a ramp capacitor from zero during the positive voltage period, so as to generate the rising ramp;

and a voltage decreasing circuit, which is configured to operably decrease the voltage across the ramp capacitor after the positive voltage period ends, so as to generate the falling ramp; wherein an absolute value of the slope of the rising ramp is the same as an absolute value of the slope of the falling ramp.

In one embodiment, the voltage increasing circuit includes: a first switch; and a first current source; wherein the first switch is configured to operably conduct the first current source to charge the ramp capacitor according to the voltage detection signal during the positive voltage period.

In one embodiment, the voltage decreasing circuit includes: a second switch; and a second current source; wherein the second switch is configured to operably conduct the second current source to discharge the ramp capacitor after the positive voltage period ends.

In one embodiment, the resonant switching power converter further comprises: a controller, which is coupled to the zero current estimation circuit, wherein the controller is configured to operably generate the charging operation signal and the at least one discharging operation signal according to the zero current estimation signal.

In one embodiment, the controller includes: a delay circuit, which is configured to operably cause the zero current estimation signal to maintain for a delay period, so that the charging process and the at least one discharging processes are separated from each other by the delay period.

In one embodiment, the voltage detection circuit includes: at least one comparator, which is configured to operably compare a voltage at one end of the at least one charging inductor with a voltage at the other end of the at least one charging inductor and/or compare a voltage at one end of the at least one discharging inductor with a voltage at the other end of the at least one discharging inductor.

In one embodiment, the at least one comparator includes two comparators, and wherein one of the two comparators is coupled to the two ends of the at least one charging inductor, whereas, the other of the two comparators is coupled to the two ends of the at least one discharging inductor.

In one embodiment, the timer further includes: a reset switch, which is connected in parallel to the ramp capacitor, wherein the reset switch is configured to operably discharge the voltage across the ramp capacitor to zero voltage after the zero current estimation signal is generated.

In one embodiment, during the delay period, the plurality of switches are kept OFF.

In one embodiment, the at least one charging inductor is one single charging inductor and the at least one discharging inductor is one single discharging inductor.

In one embodiment, the inductance of the one single charging inductor is identical as the inductance of the one single discharging inductor.

In one embodiment, In one embodiment, the at least one charging inductor and the at least one discharging inductor is one same single inductor.

In one embodiment, the one same single inductor is a variable inductor.

In one embodiment, the charging process has a charging resonant frequency, whereas, the discharging process has a discharging resonant frequency, and wherein the charging resonant frequency is the same as the discharging resonant frequency.

In one embodiment, the charging process has a charging resonant frequency, whereas, the discharging process has a discharging resonant frequency, and wherein the charging resonant frequency is different from the discharging resonant frequency.

In one embodiment, the timer adjusts a level to the zero current threshold to shorten or prolong the ON period for a zero voltage period, so as to achieve zero voltage switching of the plurality of switches.

In one embodiment, the resonant switching power converter is a bidirectional resonant switching power converter.

In one embodiment, a voltage conversion ratio of the input voltage to the output voltage of the resonant switching power converter is 4:1, 3:1 or 2:1.

In one embodiment, the timer includes: a counter circuit; and a determination circuit; wherein when the voltage detection signal is switched from low level to high level, the counter circuit starts counting according to a clock signal and outputs a counting result to the determination circuit, and wherein when the voltage detection signal is switched from high level to low level, the counter circuit counts down from a last counting result according to the clock signal; wherein when the counter circuit counts down to zero or a counting threshold, the determination circuit generates the zero current estimation signal.

In one embodiment, after the determination circuit generates the zero current estimation signal, the determination circuit outputs a reset signal to the counter circuit, so as to reset the counter circuit.

From another perspective, the present invention provides a resonant switching power converter, which is configured to operably convert an input voltage to an output voltage; the resonant switching power converter comprising: at least one resonator, wherein the at least one resonator includes a resonant capacitor and a resonant inductor which are connected in series to each other; a plurality of switches, which are coupled to the at least one resonator, wherein the plurality of switches are configured to operably switch electrical connection relationships of the at least one resonator according to a first resonant operation signal and a second resonant operation signal in correspondence to a first resonant process and a second resonant process, respectively; wherein in the first resonant process, a resonant charging operation is performed on the at least one resonator, and wherein in a second resonant process, a resonant discharging operation is performed on the at least one resonator; at least one non-resonant capacitor, whose electrical connection relationship with the at least one resonator is controlled according to the first resonant operation signal and the second resonant operation signal, wherein a voltage across the at least one non-resonant capacitor has a constant ratio to the input voltage; and a zero current estimation circuit, which is coupled to the resonant inductor of the at least one resonator, wherein the zero current estimation circuit is configured to operably estimate a time point at which a first resonant current flowing through the resonant inductor is zero during a first resonant process and/or estimate a time point at which a second resonant current flowing through the resonant inductor is zero during a second resonant process according to a voltage difference across two ends of the resonant inductor, so as to correspondingly generate a zero current estimation signal; wherein the zero current estimation signal is for generating the first resonant operation signal and the second resonant operation signal; wherein the first resonant operation signal and the second resonant operation signal have respective ON periods do not overlap one another, so that the first resonant process and the second resonant process do not overlap each other; wherein the first resonant process and the second resonant process are arranged in a repeated, alternating manner, so as to convert the input voltage to the output voltage.

Advantages of the present invention include: that the present invention can reduce inrush current; and that the present invention can estimate zero current timing by a voltage across the inductor or capacitor, so as to achieve zero current switching (ZCS) or zero voltage switching (ZVS) to improve power conversion efficiency without using a current sensing resistor or current sensing transformer.

Other advantages of the present invention include: that the present invention can reduce power consumption caused by high current flowing through a current sensing resistor; that the present invention can solve the inaccuracy problem of a large size current sensing resistor sensing a low current.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
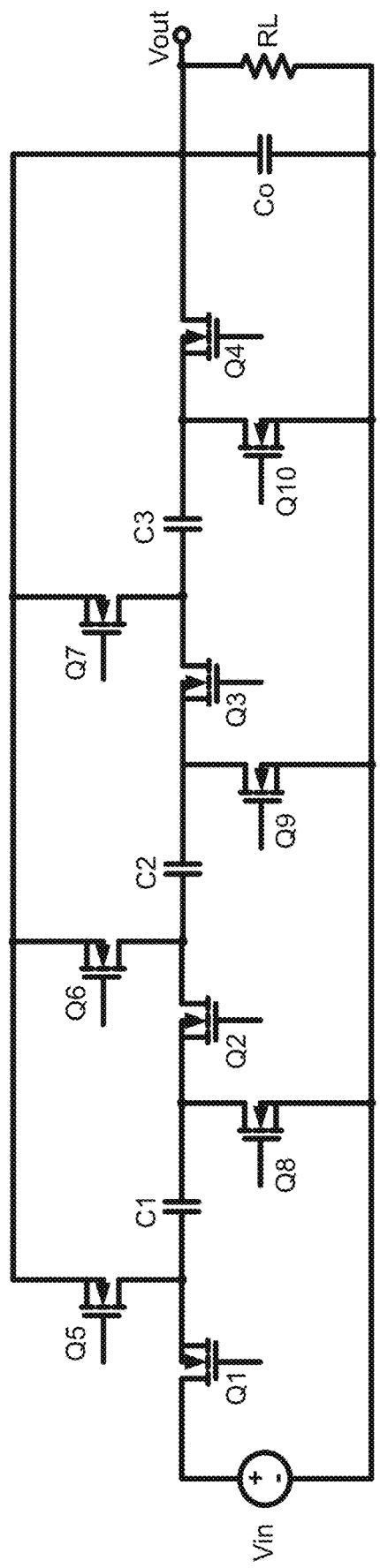
FIG. 1 shows a schematic diagram of a conventional power converter.
Figure 2:
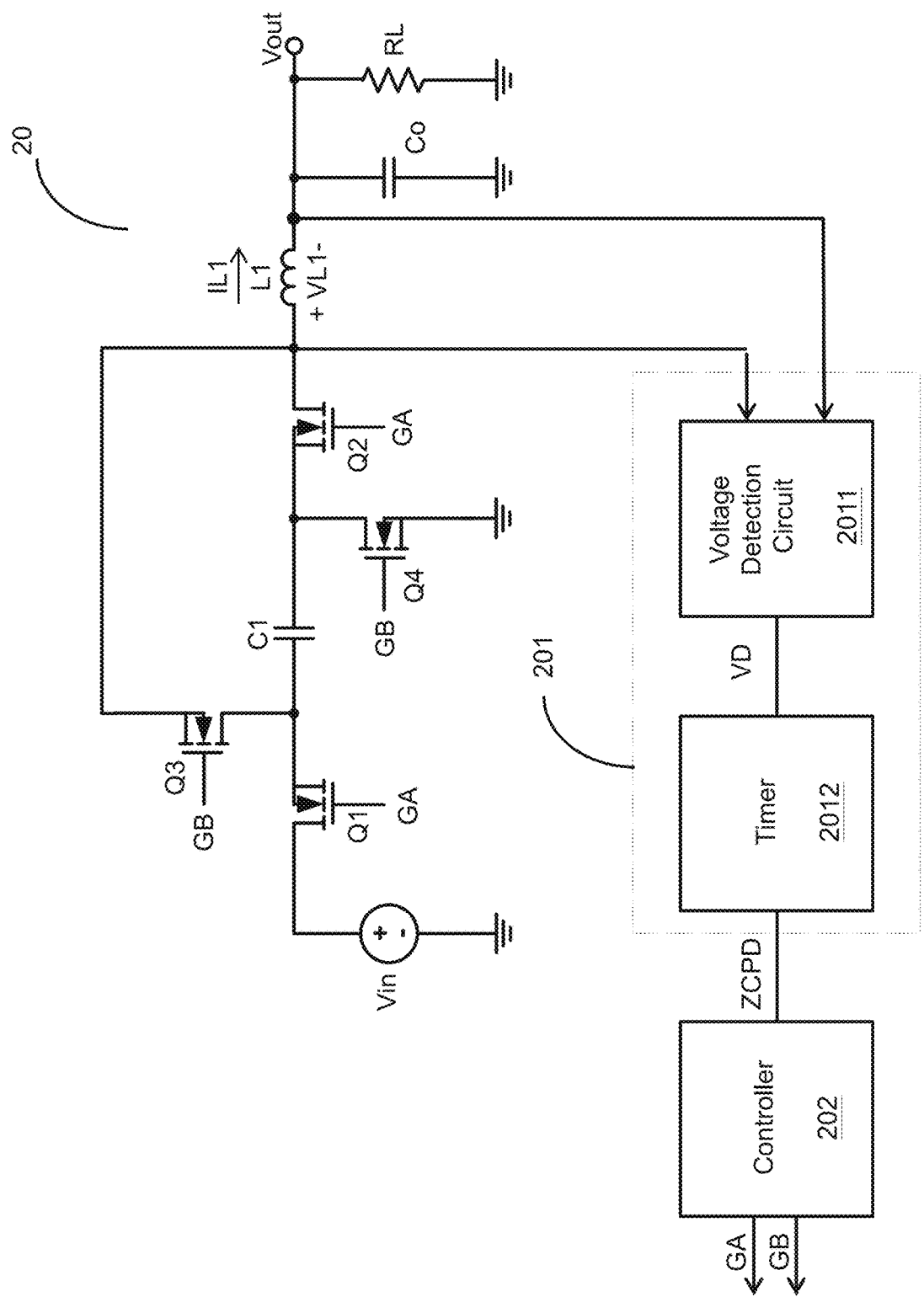
FIG. 2 shows a schematic circuit diagram of a resonant switching power converter according to an embodiment of the present invention.

Please refer to FIG. 2, which shows a schematic circuit diagram of a resonant switching power converter according to an embodiment of the present invention. As shown in FIG. 2, this embodiment adopts one same single inductor L1 to function as a charging inductor and a discharging inductor during different periods; this embodiment can reduce the required inductor number. As shown in FIG. 2, the resonant switching power converter 20 of the present invention comprises: a capacitor C1, switches Q1, Q2, Q3 and Q4, an inductor L1, a zero current estimation circuit 201 and a controller 202. The switch Q1 is connected in series to the capacitor C1. The switch Q2 is connected in series to the inductor L1. However, it should be understood that the implementation of the number of the capacitor of the resonant switching power converter 20 as one in the above-mentioned preferred embodiment is only an illustrative example, but not for limiting the broadest scope of the present invention. In other embodiments, it is also practicable and within the scope of the present invention that the number of the capacitor(s) of the resonant switching power converter 20 can be two or more. It should be understood that the number of a device in the above-mentioned preferred embodiment is only given as an illustrative example.

It is noteworthy that the same single inductor L1 functions as a charging inductor and a discharging inductor during different periods, and in the charging process and in the discharging process, the capacitor C1 is connected to this inductor L1 in different connection relationships vby switching of the switches Q1-Q4. As one of average skill in the art readily understands, that "the same single inductor L1 functions as a charging inductor and a discharging inductor during different periods", means that during the charging process, the inductor current IL1 flows through the single inductor L1 to serve as the charging resonant current, but does not flow through any other inductor, and during the discharging process, the inductor current IL1 flows through the single inductor L1 to serve as the discharging resonant current, but does not flow through any other inductor. In one embodiment, the inductor L1 can be a variable inductor.

As shown in FIG. 2, one end of the switch Q3 is coupled to a node between the switch Q1 and the capacitor C1. One end of the switch Q4 is coupled to a node between the switch Q2 and the capacitor C1. As shown in FIG. 2, the other end of the switch Q3 is coupled to a node between the switch Q2 and the inductor L1, whereas, the other end of the switch Q4 is coupled to a ground voltage level. The other end of the inductor L3 is coupled to an output voltage Vout. The other end of the switch Q1 is coupled to input voltage Vin. In the context of this specification, a switch is regarded as a two-end device and its control terminal is regarded as a control input, not an "end".

The zero current estimation circuit 201 is coupled to the inductor L1. The zero current estimation circuit 201 is configured to operably estimate a time point at which a charging resonant current is zero during the charging process and/or estimate a time point at which a discharging resonant current is zero during the discharging process according to a voltage difference across two ends of the inductor L1, so as to correspondingly generate a zero current estimation signal ZCPD. The zero current estimation signal ZCPD is employed for generating a charging operation signal GA and a discharging operation signal GB.

In one embodiment, the zero current estimation circuit 201 includes: a voltage detection circuit 2011 and a timer 2012. Please refer to FIG. 2 in conjugation with FIG. 4. FIG. 4 illustrates waveform diagrams of relevant signals related to the operation of resonant switching power shown in FIG. 2 and the operation of resonant switching power shown in FIG. 3. The voltage detection circuit 2011 is configured to operably generate a voltage detection signal VD according to the voltage difference VL1 across the two ends of the inductor L1, wherein the voltage detection signal VD is indicative of a positive voltage period T1 wherein the voltage difference VL1 across two ends of the inductor L1 is positive. The timer 2012 is coupled to an output end of the voltage detection circuit 2011 and is configured to operably generate the zero current estimation signal ZCPD according to the voltage detection signal VD. The zero current estimation signal ZCPD is indicative of a time point at which the inductor current IL1 is zero. The controller 202 is coupled to the zero current estimation circuit 201. The controller 202 is configured to operably generate the charging operation signal GA and the discharging operation signal GB according to the zero current estimation signal ZCPD. The charging operation signal GA is configured to operably control the switches Q1-Q2, whereas, the discharging operation signal GB is configured to operably control the switches Q3-Q4. In one embodiment, the controller 202 is configured to operably determine a starting time point and an ending time point of the charging process and a starting time point and an ending time point of the discharging processes according to the zero current estimation signal ZCPD, the charging operation signal GA and/or the discharging operation signal GB.

The switches Q1-Q4 can switch electrical connection relationships between the capacitor C1 and the inductor L1 according to the charging operation signal GA and the discharging operation signal GB generated by the controller 202. On one hand, in a charging process, according to the charging operation signal G1, the switches Q1-Q2 are turned ON, whereas, the switches Q3-Q4 are turned OFF, so that a series connection of the capacitor C1 and the inductor L1 is formed between the input voltage Vin and the output voltage Vout, to form a charging path to perform a resonant charging operation upon the capacitor C1 and the inductor L1. For example, as shown by FIG. 4, a charging process is executed in a period ranging between the time point t0 to the time point t2; during the charging process, the charging operation signal GA is at high level, so as to control the switches Q1 and Q2 to be ON, whereas, the discharging operation signal GB is at low level, so as to control the switches Q3 and Q4 to be OFF. On the other hand, in a discharging process, according to the discharging operation signal GB, the switches Q3-Q4 are ON, whereas, the switches Q1-Q2 are OFF, so that a series connection of the capacitor C1 and the inductor L1 is formed between the output voltage Vout and the ground voltage level, to form a discharging path, to perform a resonant discharging operation upon the capacitor C1 and the inductor L1. For example, as shown by FIG. 4, a discharging process is executed a period ranging between the time point t2 to the time point t4; during the discharging process, the charging operation signal GA is at low level, so as to control the switches Q1 and Q2 to be OFF, whereas, the discharging operation signal GB is at high level, so as to control the switches Q3 and Q4 to be ON. It is noteworthy that, in one embodiment, the above-mentioned charging process and the above-mentioned discharging process are arranged in a repeated, alternating manner. The above-mentioned charging process and the above-mentioned discharging process are not performed at the same time. In this embodiment, the DC bias voltage of the capacitor C1 has a level of Vo (as shown by a black thick dashed line in FIG. 4). As a consequence, the capacitor C1 of this embodiment, as compared to the prior art, will only need to withstand a relatively lower rated voltage. Hence, this embodiment can utilize a capacitor having a smaller size.

In one embodiment, because the zero current estimation signal ZCPD is generated when a current flowing through the charging inductor L3 or the discharging inductor L2 is approximately zero, which means that the charging operation signal switches its level when a current flowing through the charging inductor L3 or the discharging inductor L2 is approximately zero, the switches Q1-Q4 can be switched at a time point at which the currents flowing through the switches are at a relatively lower level of their respective positive half waves, whereby soft switching can be achieved. In one embodiment, zero current switching (ZCS) can be achieved.

In one embodiment, during a charging process, the switches Q1-Q2 can be turned OFF in advance by a predetermined period (i.e., the turned-OFF time point of the switches Q1-Q2 is pulled in by a predetermined period). Because it is a characteristic of the inductor L1 to resist dramatic current change, after the switches Q1-Q2 have been turned OFF, a little amount of current remains, which flows through the inductor L1 to take away accumulated charges stored in a parasitic capacitor of the switch Q4 via the parasitic diode of the switch Q2, so that the voltage across the switch Q4 can be reduced, thus achieving soft switching. In one embodiment, zero voltage switching (ZVS) can be achieved through adjustment of the predetermined period. In one embodiment, during a discharging process, the switches Q3-Q4 can be turned OFF later by a predetermined period (i.e., the turned-OFF time point of the switches Q3-Q4 is delayed by a predetermined period). In other words, the switches Q3-Q4 remains ON during the predetermined period. Thus, during the delayed turned-OFF period of the switches Q3-Q4 (the delayed turned-OFF period refers to a period before the switches Q3-Q4 are turned OFF), a discharging current (i.e., a negative current) which reversely flows through the inductor L1 will flow through a parasitic diode of the switch Q3, to charge a parasitic capacitor of the switch Q1. As a result, the voltage across the switch Q1 will be reduced, for achieving soft switching. In one embodiment, zero voltage switching (ZVS) can be achieved through adjustment of the predetermined period.

In one embodiment, the above-mentioned resonant switching power converter 20 can be a bidirectional resonant switching power converter. In one embodiment, a voltage conversion ratio of the input voltage Vin to the output voltage Vout of the above-mentioned resonant switching power converter 20 is 2:1.

Figure 3:
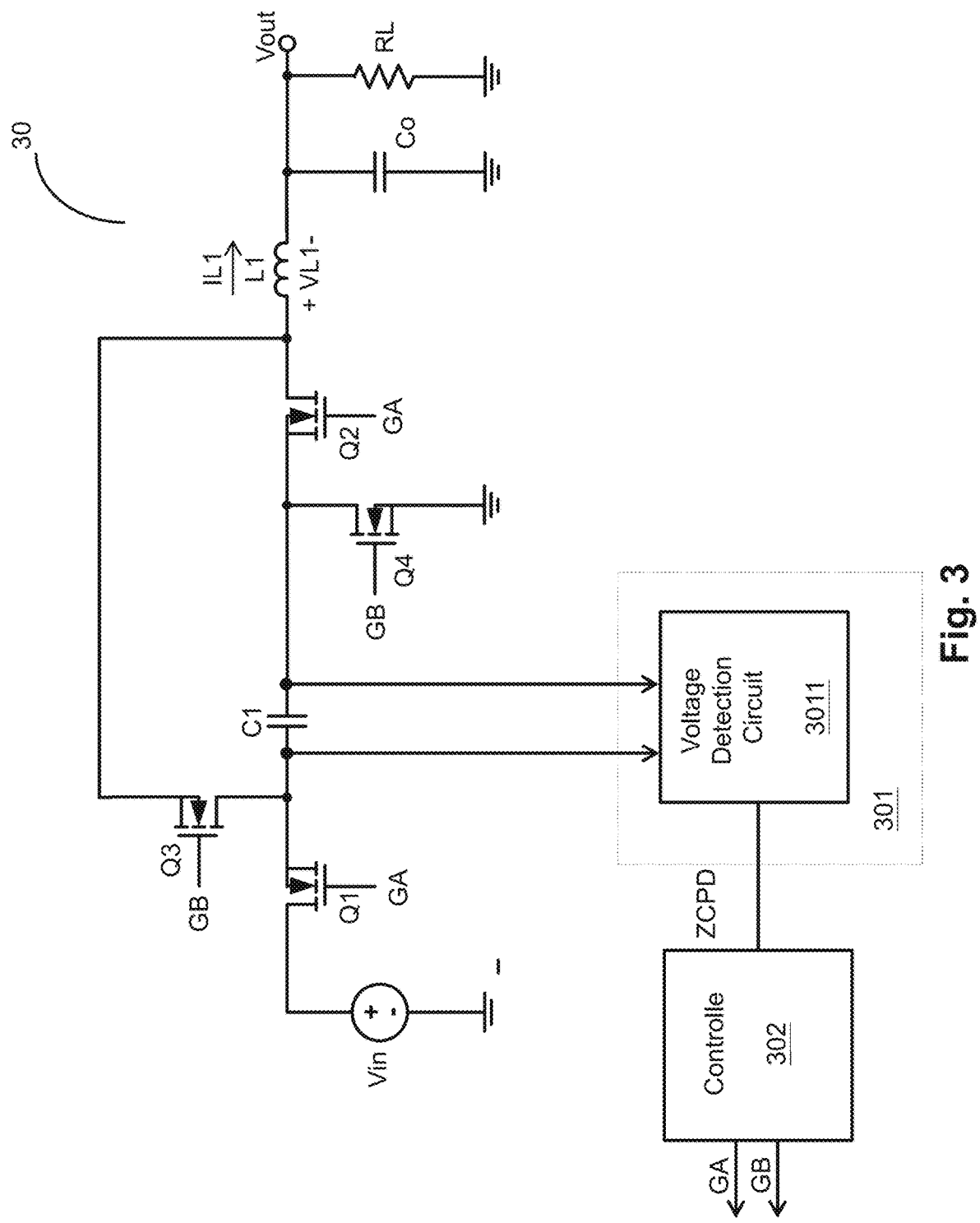
FIG. 3 shows a schematic circuit diagram of a resonant switching power converter according to another embodiment of the present invention.
Figure 4:
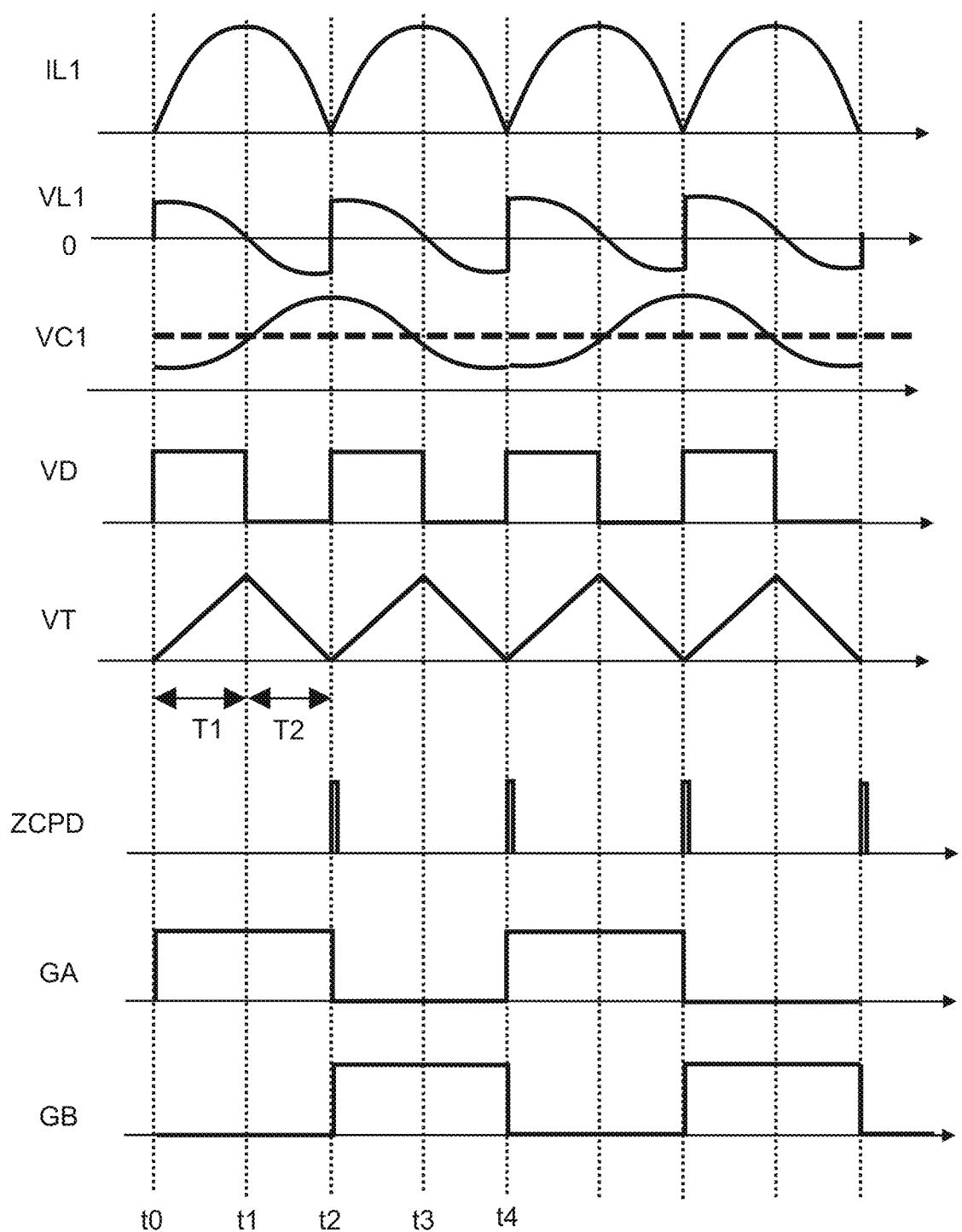
FIG. 4 illustrates waveform diagrams of relevant signals related to the operation of resonant switching power shown in FIG. 2 and the operation of resonant switching power shown in FIG. 3.

Please refer to FIG. 3, which shows a schematic circuit diagram of a resonant switching power converter according to another embodiment of the present invention. The operations of the switches Q1-Q4 in the charging process and in the discharging process are the same as the embodiment shown in FIG. 2. This embodiment shown in FIG. 3 is similar to the embodiment shown in FIG. 2, but is different in that: the zero current estimation circuit 301 in this embodiment is coupled to a capacitor C1. The zero current estimation circuit 301 is configured to operably estimate a time point at which a charging resonant current is zero during the charging process and/or estimate a time point at which a discharging resonant current is zero during the discharging process according to a voltage difference across two ends of the capacitor C1, so as to correspondingly generate a zero current estimation signal ZCPD. The zero current estimation signal ZCPD is employed to generate a charging operation signal GA and a discharging operation signal GB.

In this embodiment, the zero current estimation circuit 301 includes a voltage detection circuit 3011, which is configured to operably generate a voltage detection signal according to the voltage difference across two ends of the capacitor C1, wherein the voltage detection signal is indicative of an occurrence time point of a peak of the voltage difference across the two ends of the capacitor C1 (e.g., as shown by the timing point t2 in FIG. 4) and an occurrence time point of a valley of the voltage difference across the two ends of the capacitor C1 (e.g., as shown by the timing point t4 in FIG. 4) to a valley of the waveform indicative of the voltage difference across the two ends of the capacitor C1. The zero current estimation signal ZCPD is generated according to the voltage detection signal. Peak and valley detections can be achieved by various ways, which are well known to those skilled in the art, so the details thereof are not redundantly explained here.

Figure 5:
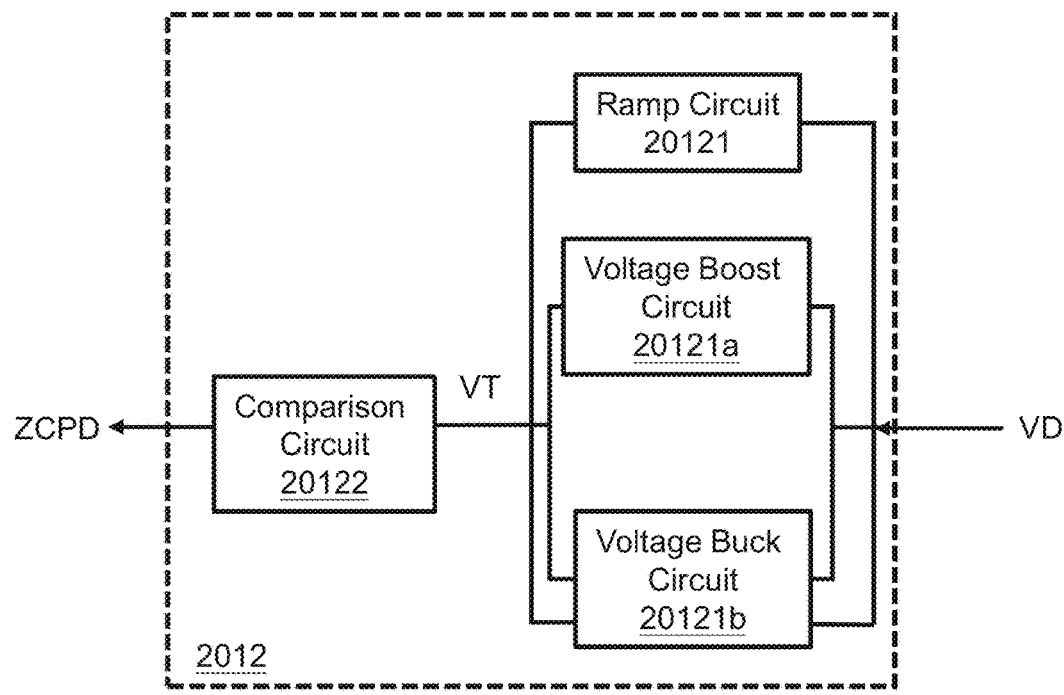
FIG. 5 shows an embodiment of a timer in a resonant switching power converter according to an embodiment of the present invention.

Please refer to FIG. 5, which shows an embodiment of a timer in a resonant switching power converter according to an embodiment of the present invention. The timer 2012 of this embodiment is one specific embodiment of the timer 2012 shown in FIG. 2. The timer 2012 shown in FIG. 2 can be embodied as an analog-type timer or a digital-type timer. The timer 2012 shown in FIG. 5 is an example of a digital-type timer. In this embodiment, the timer 2012 shown in FIG. 5 includes a ramp circuit 20121 and a comparison circuit 20122. Please refer to FIG. 2 in conjugation with FIG. 4. The ramp circuit 20121 is coupled to a voltage detection circuit 2011. The ramp circuit 20121 is configured to operably generate a rising ramp of a ramp signal VT according to the voltage detection signal VD during the positive voltage period T1, and to operably generate a falling ramp of the ramp signal VT during a negative voltage period T2 according to the rising ramp after the positive voltage period T1 ends. As one having ordinary skill in the art readily understands, "positive voltage period T1" refers to a period wherein the voltage difference across two ends of the inductor L1 is above zero voltage, and "negative voltage period T2" refers to a period wherein the voltage difference across two ends of the inductor L1 is below zero voltage. The comparison circuit 20122 is coupled to the ramp circuit 20121. The comparison circuit 20122 is configured to operably compare the ramp signal VT with a zero current threshold Vref1, so as to generate the zero current estimation signal ZCPD for determining a starting time point and an ending time point of the charging process and a starting time point and an ending time point of the at least one discharging processes.

In one embodiment, the ramp circuit 20121 includes: a voltage increasing circuit 20121a and a voltage decreasing circuit 20121b. The voltage increasing circuit 20121a is configured to operably increase a voltage across a ramp capacitor from zero during the positive voltage period T1, so as to generate the rising ramp. The voltage decreasing circuit 20121b is configured to operably decrease the voltage across the ramp capacitor after the positive voltage period T1 ends, so as to generate the falling ramp. During the voltage increasing operation by the voltage increasing circuit 20121a and the voltage decreasing operation by the voltage decreasing circuit 20121b, the voltage increasing circuit 20121a and the voltage decreasing circuit 20121b will output the voltage VT across the ramp capacitor to the comparison circuit 20122, so that the comparison circuit 20122 can compare the voltage VT with the zero current threshold Vref1. In one embodiment, an absolute value of a slope of the rising ramp is the same as an absolute value of a slope of the falling ramp. Thus, as the positive voltage period T1 is obtained, a value of 2-fold of the positive voltage period T1 (i.e., 2*T1) is the occurrence time point of zero current. In one embodiment, the zero current threshold Vref1 is approximately zero. In one embodiment, the level of the zero current threshold Vref1 is adjustable. For example, a level of the zero current threshold Vref1 can be adjusted up or down, so as to pull in or delay the predetermined period, thus achieving zero voltage switching (ZVS).

Figure 6:
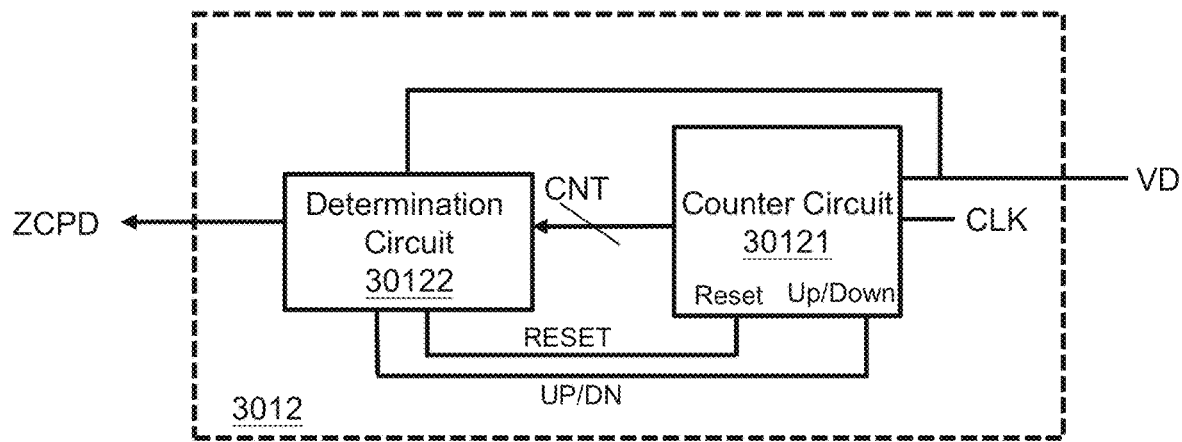
FIG. 6 shows an embodiment of a timer in a resonant switching power converter according to another embodiment of the present invention.

Please refer to FIG. 6, which shows an embodiment of a timer in a resonant switching power converter according to another embodiment of the present invention. The timer 3012 of this embodiment is one specific embodiment of the timer 2012 shown in FIG. 2. The timer 3012 shown in FIG. 6 is an example of a digital-type timer. In one embodiment, the timer 3012 includes: a counter circuit 30121 and a determination circuit 30122. The counter circuit 30121 is coupled to the voltage detection circuit 2011. The counter circuit 30121 is configured to operably generate a counting signal CNT according to a voltage detection signal VD and a clock signal CLK. The counting signal CNT is indicative of a current count. The determination circuit 30122 is coupled to the counter circuit 30121. The determination circuit 30122 is configured to operably generate a zero current estimation signal ZCPD and a reset signal RESET according to the counting signal CNT. The determination circuit 30122 is also configured to operably generate a counting-up signal UP and a counting-down signal DN. On one hand, when the determination circuit 30122 detects that the voltage detection signal VD is a high-level signal, the determination circuit 30122 generates the counting-up signal UP, which is feedback to the counter circuit 30121, so that the counter circuit 30121 starts counting-up from zero according to a speed of the clock signal CLK to generate a count which is the counting signal CNT, and the counting signal CNT is outputted to the determination circuit 30122. On the other hand, when the determination circuit 30122 detects that the voltage detection signal VD is a low-level signal, the determination circuit 30122 generates the counting-down signal DN, which is feedback to the counter circuit 30121, so that the counter circuit 30121 starts counting-down from a last counting result according to a speed of the clock signal CLK. When the determination circuit 30122 detects that that the counting signal CNT is zero, the determination circuit 30122 determines that the counter circuit 30121 has countdown to zero and the determination circuit 30122 generates the zero current estimation signal ZCPD accordingly, and the determination circuit 30122 also generates a reset signal RESET, which is feedback to the counter circuit 30121, to reset the counter circuit 30121.

Figure 7:
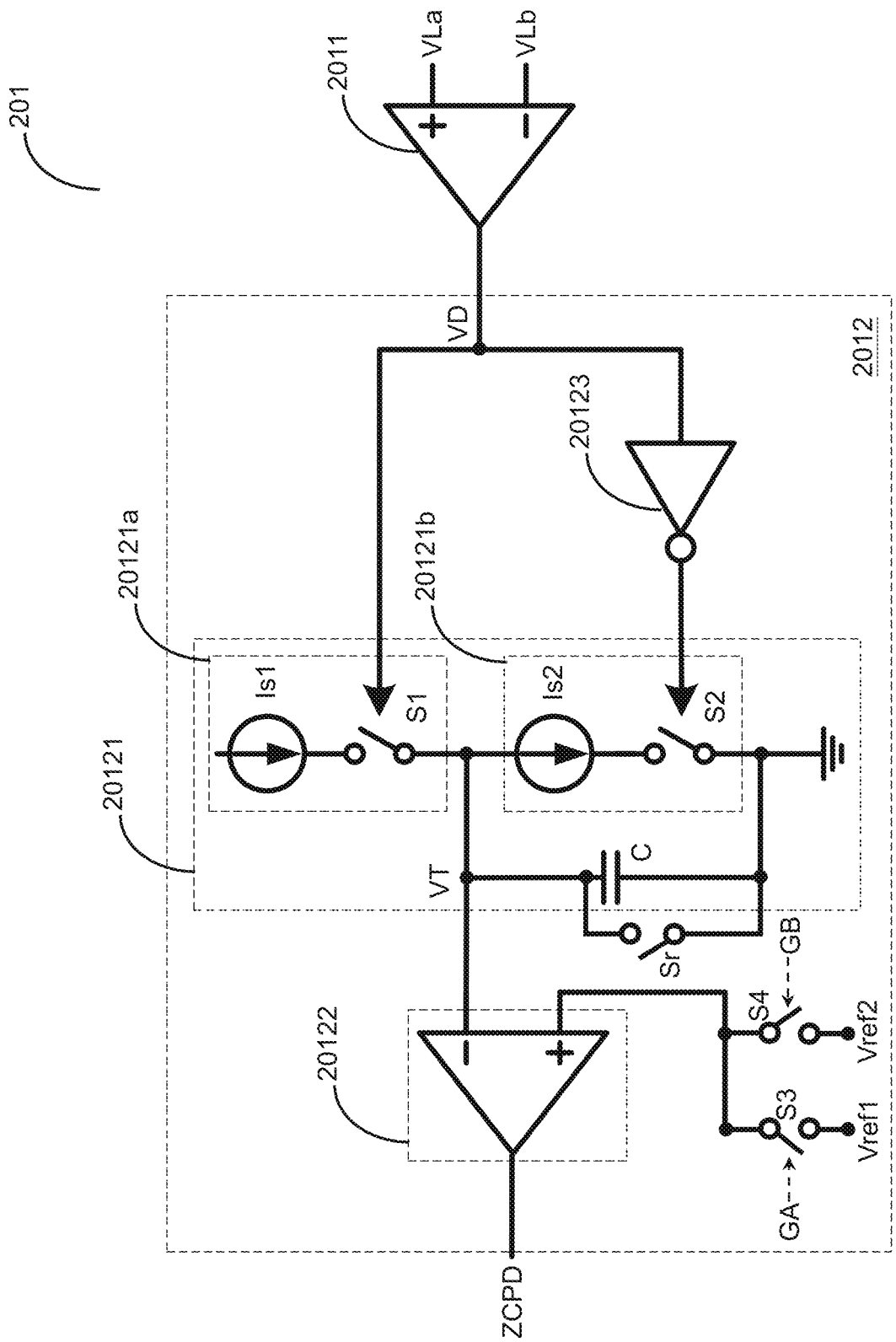
FIG. 7 shows a schematic circuit diagram of an embodiment of a zero current estimation circuit in a resonant switching power converter according to yet another embodiment of the present invention.

Please refer to FIG. 7, which shows a schematic circuit diagram of an embodiment of a zero current estimation circuit in a resonant switching power converter according to yet another embodiment of the present invention. The zero current estimation circuit 201 of this embodiment is one specific embodiment of the zero current estimation circuit 201 shown in FIG. 2. The timer 2012 shown in FIG. 7 is another example of a digital-type timer. As shown in FIG. 7, in one embodiment, the zero current estimation circuit 201 includes: a voltage detection circuit 2011 and a timer 2012. The voltage detection circuit 2011 can be for example a comparator, which is configured to operably detect the voltage difference VL1 across the two ends of the inductor L1. In one embodiment, the timer 2012 shown in FIG. 7 includes: a ramp circuit 20121 and a comparison circuit 20122. The comparison circuit 20122 is configured to operably compare a voltage VT at a high side voltage node of the ramp capacitor C with a zero current threshold Vref1 or Vref2. A positive input end of the comparison circuit 20122 is coupled to the zero current threshold Vref1 via a switch S3 and is coupled to the zero current threshold Vref2 via a switch S4.

In one embodiment, the zero current threshold Vref1 is a positive value, whereas, the zero current threshold Vref2 is a negative value. When the charging operation signal GA or a signal pertinent to the charging operation signal GA is at high level, the switch S3 is turned ON. When the charging operation signal GB or a signal pertinent to the discharging operation signal GB is at high level, the switch S4 is turned ON. When the charging operation signal GA or the signal pertinent to the charging operation signal GA is at high level and when the voltage VT is smaller than the zero current threshold Vref1, the comparison circuit 20122 will generate a zero current estimation signal ZCPD. When the charging operation signal GB or the signal pertinent to the discharging operation signal GB is at high level and when the voltage VT is smaller than the zero current threshold Vref2, the comparison circuit 20122 will generate a zero current estimation signal ZCPD.

In one embodiment, the ramp circuit 20121 includes: a voltage increasing circuit 20121a and a voltage decreasing circuit 20121b. In one embodiment, the voltage increasing circuit 20121a includes: a first switch S1 and a first current source Is1. The first switch S1 is configured to operably conduct the first current source Is1 to charge the ramp capacitor C according to the voltage detection signal VD during the positive voltage period T1. The voltage decreasing circuit 20121b includes: a second switch S2 and a second current source Is2. The second switch S2 is configured to operably conduct the second current source Is2 to discharge the ramp capacitor C during a negative voltage period T2 after the positive voltage period T1 ends. The timer 2012 further includes a reset switch Sr, which is connected in parallel to the ramp capacitor C. The reset switch Sr is configured to operably discharge the voltage across the ramp capacitor C to zero voltage after the zero current estimation signal ZCPD is generated. Because the ramp capacitor C has one end coupled to a high side voltage node and has the other end coupled to a ground voltage level, the voltage VT at the high side voltage node is the voltage across the ramp capacitor C. In one embodiment, the first current source Is1 and the second current source Is2 can be a bias current source.

When the voltage detection circuit 2011 detects that a voltage difference (i.e., VLa−VLb) between a voltage VLa at a left side of the inductor L1 and a voltage VLb at a right side of the inductor L1 is positive, the voltage detection circuit 2011 generates a voltage detection signal VD having high level, so that the first switch S1 is turned ON, thus conducting the first current source Is1 to charge the ramp capacitor C. Consequently, the voltage VT increases from zero. Besides, a NOT operation by a NOT gate 20123 on the voltage detection signal VD having high level generates a low level signal to turned OFF the second switch S2. On the other hand, when the voltage detection circuit 2011 detects that the voltage difference (i.e., VLa−VLb) between the voltage VLa at the left side of the inductor L1 and the voltage VLb at the right side of the inductor L1 is negative, the voltage detection circuit 2011 generates a voltage detection signal VD having low level, so that the first switch S1 is turned OFF. Besides, a NOT operation by the NOT gate 20123 on the voltage detection signal VD having low level generates a high level signal to turned ON the second switch S2, thus causing the second current source Is2 to discharge the ramp capacitor C via the ground voltage level. As a consequence, the voltage VT decreases. When the comparison circuit 20122 finds that the voltage VT is smaller than the zero current threshold Vref1 (i.e., when the charging operation signal GA or the signal pertinent to the charging operation signal GA is at high level), the comparison circuit 20122 will generate a zero current estimation signal ZCPD, whereby the controller 202 can generate the charging operation signal GA and the discharging operation signal GB based upon the zero current estimation signal ZCPD. In one embodiment, the zero current threshold Vref1 or the zero current threshold Vref2 is approximately zero. In one embodiment, the level of the zero current threshold Vref1 or the level of the zero current threshold Vref2 is adjustable. For example, the level of the zero current threshold Vref1 or the level of the zero current threshold Vref2 can be adjusted up or down, so as to pull in or delay the predetermined period, thus achieving zero voltage switching (ZVS). In one embodiment, the current level of the first current source Is1 is equal to the current level of the second current source Is2, so that the positive voltage period T1 will equal to the negative voltage period T2, as shown in FIG. 4.

Please still refer to FIG. 4, which illustrates waveform diagrams of relevant signals related to the operation of resonant switching power according to the present invention. The inductor current IL1, the inductor voltage VL1, the voltage detection signal VD, the voltage VT, the zero current estimation signal ZCPD, the charging operation signal GA and the discharging operation signal GB are illustrated and shown in FIG. 4.

Figure 8A:
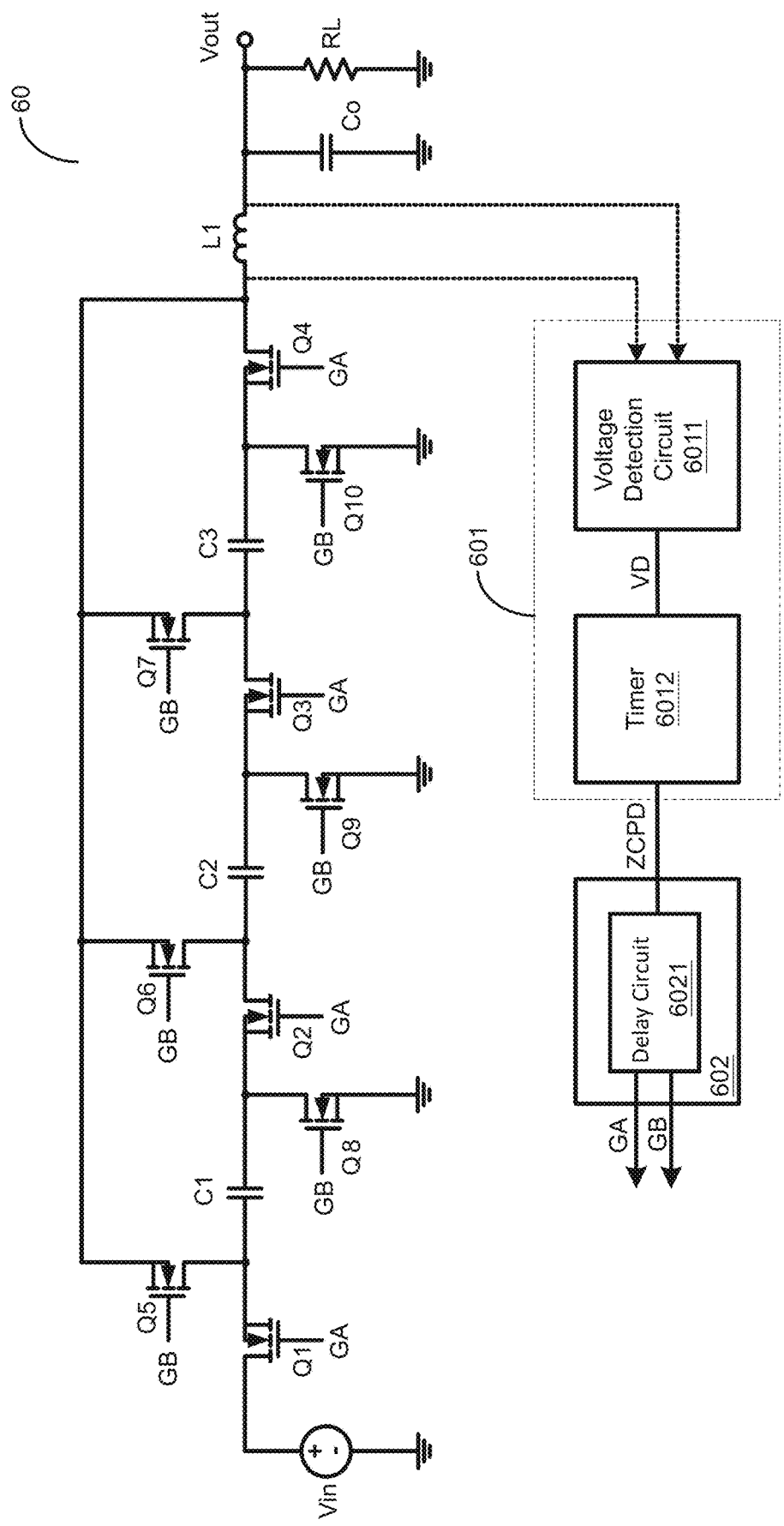
FIG. 8A shows a schematic circuit diagram of a resonant switching power converter according to still another embodiment of the present invention.
Figure 8B:
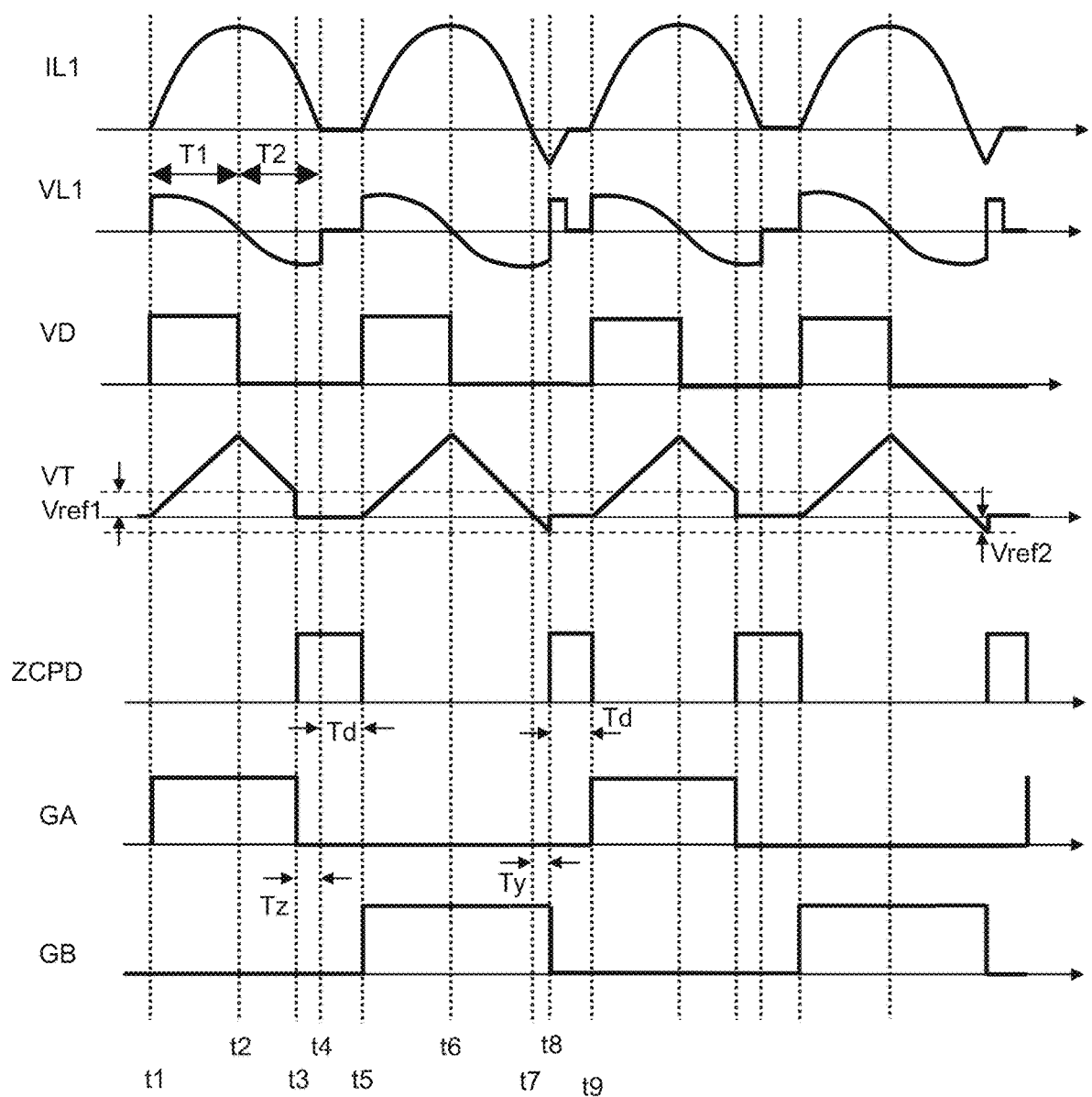
FIG. 8B illustrates waveform diagrams of relevant signals related to the operation of FIG. 8A.

Please refer to FIG. 8A, which shows a schematic circuit diagram of a resonant switching power converter according to still another embodiment of the present invention. FIG. 8B illustrates waveform diagrams of relevant signals related to the operation of FIG. 8A. The configurations of a zero current estimation circuit 601, a voltage detection circuit 6011 and a timer 6012 shown in FIG. 8A are similar to the embodiment shown in FIG. 2, so the details thereof are not redundantly repeated here. This embodiment shown in FIG. 8A is similar to the embodiment shown in FIG. 2, but is different in that: the numbers of capacitors and switches in this embodiment is different from the numbers of capacitors and switches in the embodiment shown in FIG. 2. Besides, the controller 602 includes a delay circuit 6021. The delay circuit 6021 is configured to operably cause the zero current estimation signal ZCPD to maintain for a delay period Td, so that the charging process and the at least one discharging processes are separated from each other by the delay period Td. As shown in FIG. 8A, the resonant switching power converter 60 of the present invention comprises: capacitors C1, C2 and C3, switches Q1-Q10 and an inductor L1. The switches Q1-Q3 are connected in series to the capacitors C1, C2 and C3, respectively, whereas, the switch Q4 is connected in series to the inductor L1. Certainly, it should be understood that the implementation of the number of the capacitors of the resonant switching power converter 60 as three in the above-mentioned preferred embodiment is only an illustrative example, but not for limiting the broadest scope of the present invention. In other embodiments, it is also practicable and within the scope of the present invention that the number of the capacitors of the resonant switching power converter 60 can be any multiple number other than three. It should be understood that the number of the devices in the above-mentioned preferred embodiment is only an illustrative example, but not for limiting the broadest scope of the present invention. In another embodiment, those skilled in this art can readily conceive variations and modifications within the spirit of the present invention. The timer 6012 in this embodiment can be implemented as the configuration shown in FIG. 3, FIG. 4 or FIG. 5. In one embodiment, the inductor L1 is a variable inductor.

As shown in FIG. 8A, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 8A, the other ends of the switches Q5-Q7 are commonly electrically connected to a node which is coupled to a node between the switch Q4 and the inductor L1. The other ends of the switches Q8-Q10 are commonly coupled to the ground voltage level. The other end of the inductor L1 is coupled to the output voltage Vout. The other end of the switch Q1 is coupled to input voltage Vin.

The switches Q1-Q10 can switch electrical connection relationships between the capacitors C1-C3 and the inductor L1 according to the charging operation signal GA and the discharging operation signal GB generated by the controller 602. In a charging process, according to the charging operation signal GA, the switches Q1-Q4 are ON, whereas, the switches Q5-Q10 are OFF, so that a series connection of the capacitors C1-C3 and the inductor L1 is formed between the input voltage Vin and the output voltage Vout, to form a charging path. In a discharging process, according to discharging operation signal GB, the switches Q5-Q10 are ON, whereas, the switches Q1-Q4 are OFF, so that the capacitors C1-C3 form a parallel connection, and the parallel connection is connected connected in series to the inductor L1, to form plural discharging paths. It is noteworthy that, in one embodiment, the above-mentioned charging process and the above-mentioned discharging process are arranged in a repeated, alternating manner, so as to convert the input voltage Vin to an output voltage Vout. The above-mentioned charging process and the above-mentioned discharging process are not performed at the same time. In this embodiment, the DC bias voltages of the capacitors C1, C2 and C3 all have a level of Vo. As a consequence, the capacitors C1, C2 and C3 of this embodiment, as compared to the prior art, will only need to withstand a relatively lower rated voltage. Hence, this embodiment can utilize capacitors having a smaller size.

In one embodiment, because the zero current estimation signal ZCPD is generated when a current flowing through the charging inductor L3 or the discharging inductor L2 is approximately zero, which means that the charging operation signal switches its level when a current flowing through the charging inductor L3 or the discharging inductor L2 is approximately zero, the switches Q1-Q4 can be switched at a time point at which the currents flowing through the switches are at a relatively lower level of their respective positive half waves, so that soft switching can be achieved. In one embodiment, zero current switching (ZCS) can be achieved.

In one embodiment, during a charging process, the switches Q1-Q4 can be turned OFF in advance by a predetermined period (i.e., the turned-OFF time point of the switches Q1-Q4 is pulled in by a predetermined period). Because it is a characteristic of the inductor L1 to resist dramatic current change, after the switches Q1-Q4 have been turned OFF, a little amount of current remains, which flows through the inductor L1 to take away accumulated charges stored in a parasitic capacitor of the switch Q10 via the parasitic diode of the switch Q4, so that the voltage across the switch Q10 can be reduced, thus achieving soft switching. In one embodiment, zero voltage switching (ZVS) can be achieved through adjustment of the predetermined period by adjusting the zero current threshold. In one embodiment, during a discharging process, the switches Q5-Q10 can be turned OFF later by a predetermined period (i.e., the turned-OFF time point of the switches Q5-Q10 is delayed by a predetermined period). In other words, the switches Q5-Q10 remains ON during the predetermined period. Thus, during the delayed turned-OFF period of the switches Q5-Q10 (the delayed turned-OFF period refers to a period before the switches Q5-Q10 are turned OFF), a discharging current (i.e., a negative current) which reversely flows through the inductor L1 will flow through a parasitic diode of the switch Q5, to charge a parasitic capacitor of the switch Q1. As a result, the voltage across the switch Q1 will be reduced, for achieving soft switching. In one embodiment, zero voltage switching (ZVS) can be achieved through adjustment of the predetermined period by adjusting the zero current threshold.

In one embodiment, the above-mentioned resonant switching power converter 60 can be a bidirectional resonant switching power converter. In one embodiment, a voltage conversion ratio of the input voltage Vin to the output voltage Vout of the above-mentioned resonant switching power converter 60 is 4:1, 3:1 or 2:1. In one embodiment, a voltage conversion ratio of the above-mentioned resonant switching power converter 60 is adjustable. For example, in the charging process and in the discharging process, through keeping the switch Q7 to be always ON while keeping the switches Q4 and Q10 to be always OFF, a voltage conversion ratio of the resonant switching power converter 60 can be adjusted to be 3:1. For another example, in the charging process and in the discharging process, through keeping the switch Q6 to be always ON while keeping the switches Q9, Q3, Q7, Q4 and Q10 to be always OFF, a voltage conversion ratio of the resonant switching power converter 60 can be adjusted to be 2:1.

Besides, please refer to FIG. 8B, which illustrates waveform diagrams of relevant signals related to the operation of FIG. 8A. As shown in FIG. 8B, the zero current threshold Vref1 is adjusted so that the voltage VT reaches the zero current threshold Vref1 at a time point t3, before the voltage VT naturally drops to zero at the time point t4, whereby a zero current estimation signal ZCPD is generated (i.e., the zero current estimation signal ZCPD is switched from low level to high level) at a timing to achieve soft switching. The period from the time point t3 to the time point is a predetermined period Tz (which is the "predetermined period" previously described). As shown in FIG. 8B, subsequent to the time point t3 at which the zero current estimation signal ZCPD is generated by the zero current estimation circuit 601, the zero current estimation signal ZCPD is extended for a delay period Td (i.e., the zero current estimation signal ZCPD remains at high level). During the delay period Td, the voltage detection signal VD remains at low level, while in the meantime, the charging operation signal GA and the discharging operation signal GB also remain at low level. Thus, the first switch S1 remains OFF; the second switch S2 remains ON; the switches Q1-Q10 remains OFF.

In one embodiment, the zero current estimation signal ZCPD is generated by the zero current estimation circuit 601 at the time point t3, which is ahead of the time point t4 by the predetermined period Tz, wherein the time point t4 is when the zero current estimation circuit 601 estimates that the charging resonant current IL1 is zero. Besides, subsequent to the time point t4, the zero current estimation signal ZCPD remains at high level for a delay period Td. At an ending time point t5 of the delay period Td, the discharging operation signal GB is switched from low level to high level, to execute a discharging process. And, at the time point t7, the zero current estimation circuit 601 estimates that a discharging resonant current IL1 is zero; at the time point t8, which is later than the time point t7 by a predetermined period Ty, the zero current estimation circuit 601 generates the zero current estimation signal ZCPD, and the zero current estimation signal ZCPD remains at high level for a delay period Td. At an ending time point t9 of the delay period Td, the charging operation signal GA is switched from low level to high level, to execute a charging process. The delay period Td is provided to prevent the charging process and the discharging process from overlapping one another. As shown in FIG. 8B, because an absolute value of a rising ramp of the voltage VT is equal to an absolute value of a falling ramp of the voltage VT, the positive voltage period T1 will be equal to the negative voltage period T2.

Figure 9:
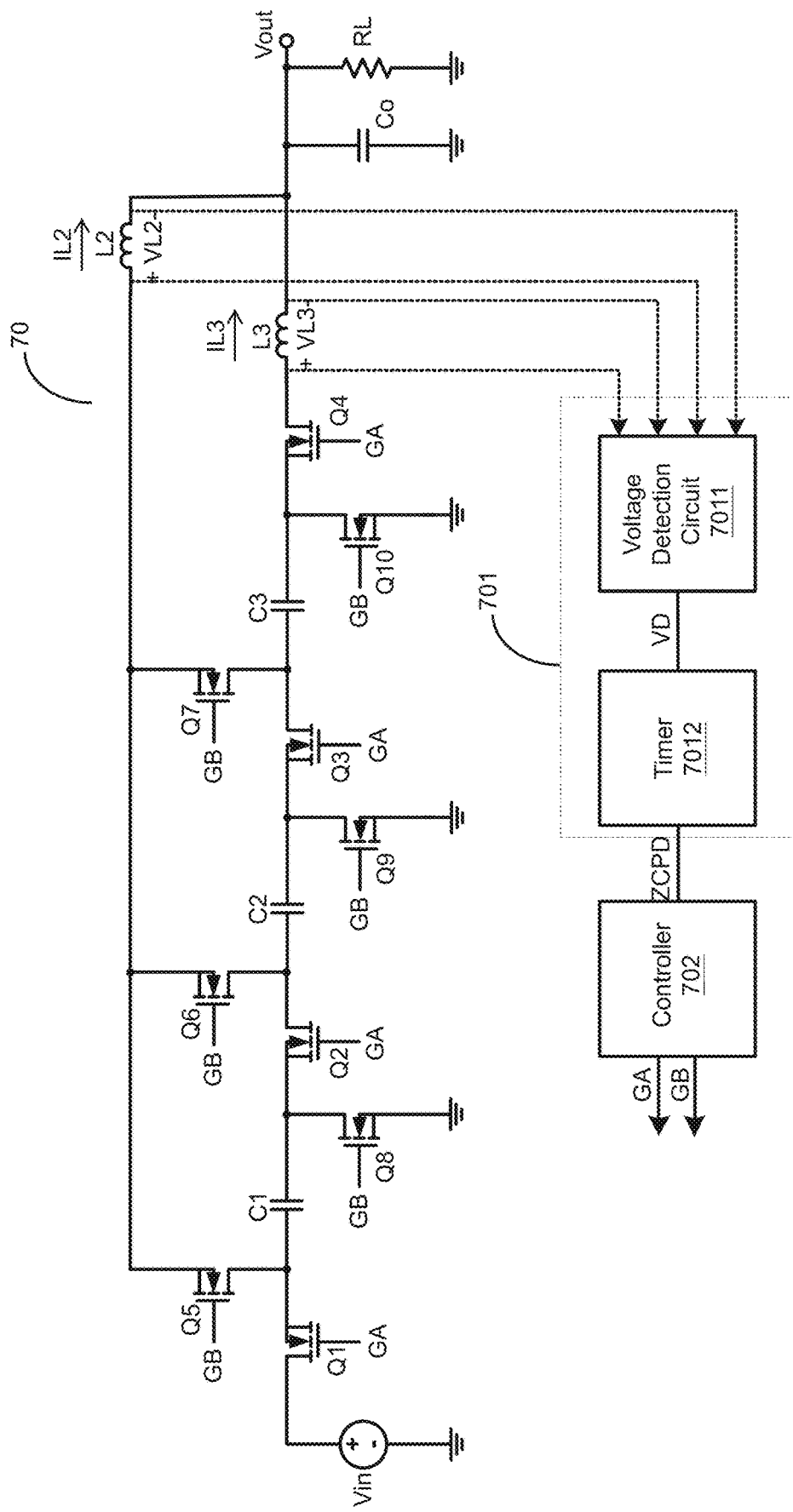
FIG. 9 shows a schematic circuit diagram of a resonant switching power converter according to still another embodiment of the present invention.

Please refer to FIG. 9, which shows a schematic circuit diagram of a resonant switching power converter according to still another embodiment of the present invention. The configurations of a zero current estimation circuit 701, a voltage detection circuit 7011, a timer 7012 and a controller 702 shown in FIG. 9 are similar to the embodiment shown in FIG. 2, so the details thereof are not redundantly repeated here. This embodiment shown in FIG. 9 is similar to the embodiment shown in FIG. 2, but is different in that: the numbers of capacitors and switches in this embodiment is different from the numbers of capacitors and switches in the embodiment shown in FIG. 2. Besides, this embodiment adopts a charging inductor L3 and a discharging inductor L2, and the zero current estimation circuit 201 is coupled to the charging inductor L3 and the discharging inductor L2. The zero current estimation circuit 201 is configured to operably estimate a time point at which a charging resonant current is zero during the charging process and/or estimate a time point at which a discharging resonant current is zero during the discharging process according to a voltage difference across two ends of the charging inductor L3 and/or a voltage difference across two ends of the discharging inductor L2, so as to correspondingly generate a zero current estimation signal ZCPD. The zero current estimation signal ZCPD is employed to generate a charging operation signal GA and a discharging operation signal GB.

In this embodiment, plural capacitors share one same single charging inductor L3 or one same single discharging inductor L2. Thus, regardless how many capacitors there may be, this embodiment can reduce the required inductor number. As shown in FIG. 7, a resonant switching power converter 70 of the present invention comprises: capacitors C1, C2 and C3, switches Q1-Q10, a charging inductor L3 and a discharging inductor L2. The switches Q1-Q3 are connected in series to the capacitors C1, C2 and C3, respectively, whereas, the switch Q4 is connected in series to the charging inductor L3. Certainly, it should be understood that the implementation of the number of the capacitors of the resonant switching power converter 70 as three in the above-mentioned preferred embodiment is only an illustrative example, but not for limiting the broadest scope of the present invention. In other embodiments, it is also practicable and within the scope of the present invention that the number of the capacitors of the resonant switching power converter 70 can be any multiple number other than three. It should be understood that the number of the devices in the above-mentioned preferred embodiment is only an illustrative example, but not for limiting the broadest scope of the present invention. The timer 7012 in this embodiment can implemented as the configuration shown in FIG. 3 or FIG. 4. In one embodiment, an inductance of the charging inductor L3 is equal to an inductance of the discharging inductor L2.

As shown in FIG. 9, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 9, the other ends of the switches Q5-Q7 are commonly electrically connected to a node which is coupled to the discharging inductor L2. The other ends of the switches Q8-Q10 are commonly coupled to the ground voltage level. The other ends of the charging inductor L3 and the discharging inductor L2 are commonly coupled to the output voltage Vout. The other end of the switch Q1 is coupled to input voltage Vin.

The switches Q1-Q10 can switch electrical connection relationships between the capacitors C1-C3 and the inductor L1 according to the charging operation signal GA and the discharging operation signal GB generated by the controller 702. In a charging process, according to the charging operation signal GA, the switches Q1-Q4 are ON, whereas, the switches Q5-Q10 are OFF, so that a series connection of the capacitors C1-C3 and the inductor L1 is formed between the input voltage Vin and the output voltage Vout, to form a charging path. In a discharging process, according to discharging operation signal GB, the switches Q5-Q10 are ON, whereas, the switches Q1-Q4 are OFF, so that the capacitors C1-C3 form a parallel connection, and the parallel connection is connected in series to the inductor L1, to form plural discharging paths. It is noteworthy that, in one embodiment, the above-mentioned charging process and the above-mentioned discharging process are executed at different periods in a repeated, alternating manner. The above-mentioned charging process and the above-mentioned discharging process are not performed at the same time. In one embodiment, a duration period of the charging process does not overlap with a duration period of the discharging process. In one embodiment, the charging process and the discharging process are executed in turn to convert the input voltage Vin to an output voltage Vout. In this embodiment, the DC bias voltages of the capacitors C1, C2 and C3 all have a level of Vo. As a consequence, when the same level of the input voltage and the same level of the output voltage are provided, the capacitors C1, C2 and C3 of this embodiment, as compared to the prior art, will only need to withstand a relatively lower rated voltage. Hence, this embodiment can utilize capacitors having a smaller size.

In one embodiment, the charging resonant frequency of the above-mentioned charging process is the same as the discharging resonant frequency of the above-mentioned discharging process. In one embodiment, the charging resonant frequency of the above-mentioned charging process is different from the discharging resonant frequency of the above-mentioned discharging process. In one embodiment, the above-mentioned resonant switching power converter 70 can be a bidirectional resonant switching power converter.

As one having ordinary skill in the art readily understands, in a "bidirectional resonant switching power converter", the input terminal (which is coupled to the input voltage Vin) and the output terminal (which is coupled the output voltage Vout) are interchangeable. That is, in the embodiment shown in FIG. 7, the resonant switching power converter 70 can convert the output voltage Vout to the input voltage Vin. In one embodiment, a voltage conversion ratio of the input voltage Vin to the output voltage Vout of the above-mentioned resonant switching power converter 70 is 4:1, 3:1 or 2:1.

In one embodiment, the duration period (Ton1) of the above-mentioned charging process is correlated with the charging resonant frequency (fr1) of the above-mentioned charging process. In one embodiment, the duration period (Ton1) of the above-mentioned charging process is correlated with a positive half wave of a charging resonant current of the charging process. For example, turned-ON time points and turned-OFF time points of the switches Q1-Q4 are substantially synchronous with a starting time point and an ending time point of the positive half wave of the charging resonant current of the charging process. In one embodiment, the duration period (Ton2) of the above-mentioned discharging process is correlated with the discharging resonant frequency (fr2) of the above-mentioned discharging process. In one embodiment, the duration period (Ton2) of the above-mentioned discharging process is correlated with a positive half wave of a discharging resonant current of the discharging process. For example, turned-ON time points and turned-OFF time points of the switches Q5-Q10 are substantially and respectively synchronous with a starting time point and an ending time point of the positive half wave of the discharging resonant current of the discharging process.

In one embodiment, because the zero current estimation signal ZCPD is generated when a current flowing through the charging inductor L3 or the discharging inductor L2 is approximately zero, which means that the charging operation signal switches its level when a current flowing through the charging inductor L3 or the discharging inductor L2 is approximately zero, the switches Q1-Q4 can be switched at a time point at which the currents flowing through the switches are at a relatively lower level of their respective positive half waves, so that soft switching can be achieved. In one embodiment, zero current switching (ZCS) can be achieved.

Note that although it is preferred for the duration period of the charging process to be equal to the duration period of the discharging process (i.e., the duration period of the charging process is equal to 50% of the cycle period (i.e., duty ratio=50%)), to achieve exact zero current switching, however due to non-idealities caused by for example imperfection of components or imperfect matching among components, the duration period of the charging process may not be equal to exactly 50% of the cycle period, but just close to 50% of the cycle period. In other words, according to the present invention, a certain level of error between the duration period of the charging process and 50% of the cycle period is acceptable, and therefore the term "substantially" is used to mean that an insignificant error within a tolerable range is acceptable. The term "substantially" used in other occurrences in this specification also means that an insignificant error within a tolerable range is acceptable.

In one embodiment, the duration period of the above-mentioned charging process is smaller than a specific ratio of cycle period by a predetermined period. For example, the duration period of the above-mentioned charging process is smaller than 50% of the cycle period by a predetermined period. Thus, after the switches Q1-Q4 have been turned OFF, a little amount of current remains, which flows through the charging inductor L1 to take away accumulated charges stored in a parasitic capacitor of the switch Q10 via the parasitic diode of the switch Q4, so that the voltage across the switch Q10 can be reduced, thus achieving soft switching. In one preferred embodiment, the predetermined period can be adjusted by adjusting the level of the reference signal, to achieve zero voltage switching (ZVS).

In one embodiment, the duration period of the above-mentioned discharging process is greater than a specific ratio of cycle period by a predetermined period. For example, the duration period of the above-mentioned discharging process is greater than 50% of the cycle period by a predetermined period. Thus, during the delayed turned-OFF period of the switches Q5-Q10, a negative current of the discharging inductor L2 will flow through a parasitic diode of the switch Q5, to charge a parasitic capacitor of the switch Q1. As a result, the voltage across the switch Q1 will be reduced, for achieving soft switching. In one preferred embodiment, the predetermined period can be adjusted by adjusting the level of the reference signal, to achieve zero voltage switching (ZVS).

Figure 10A:
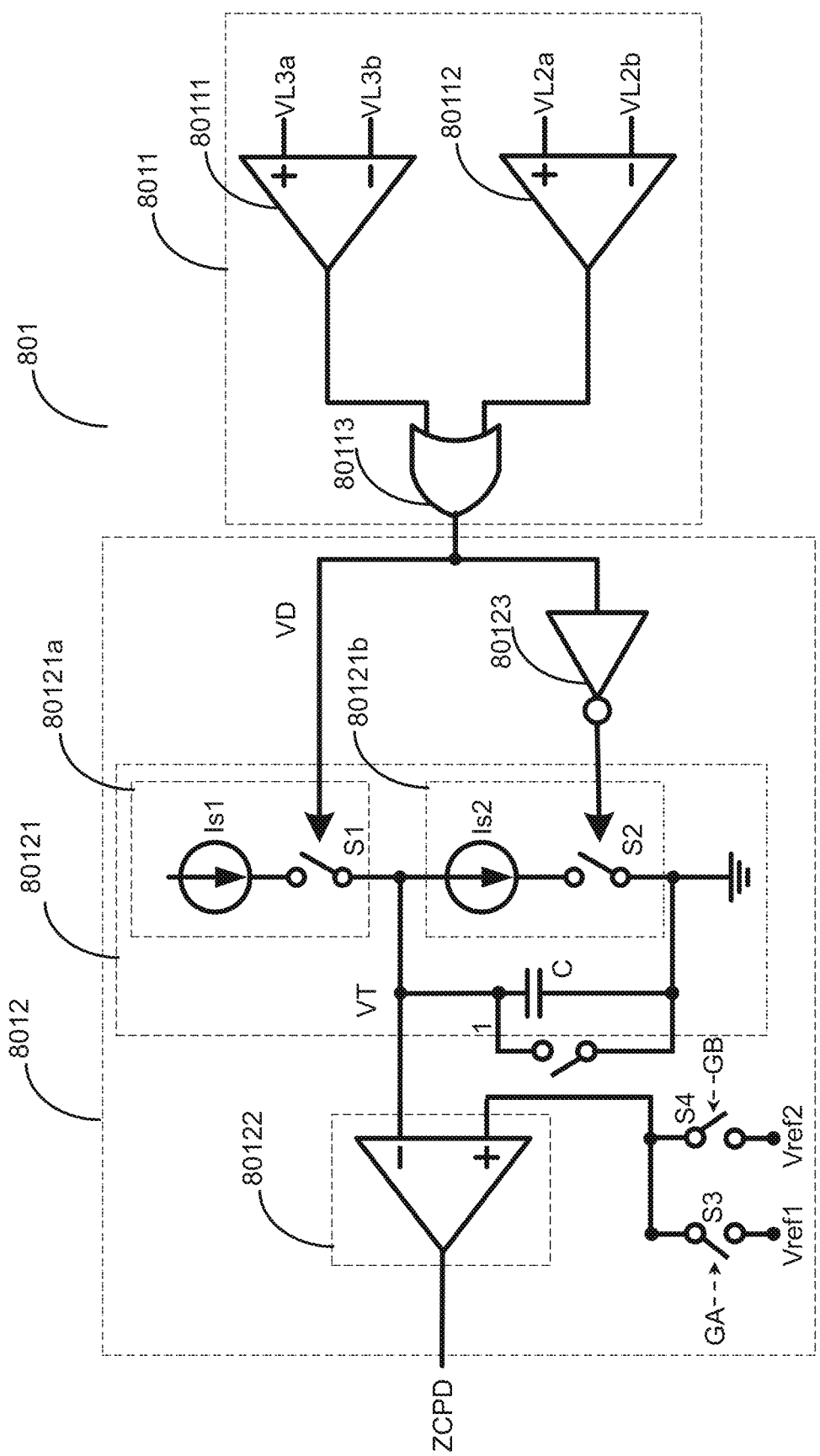
FIG. 10A shows a schematic circuit diagram of a zero current estimation circuit according to an embodiment of the present invention.
Figure 10B:
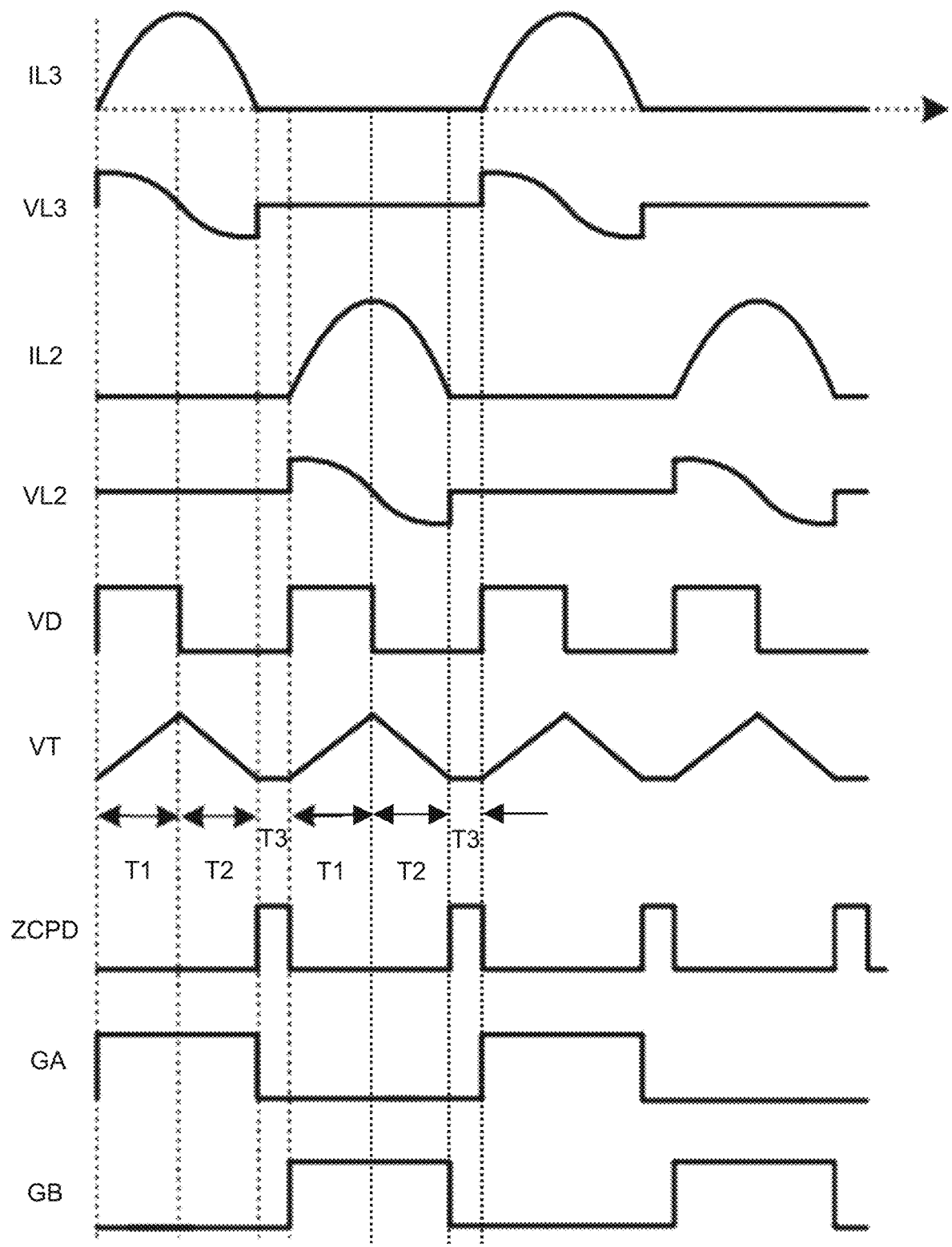
FIG. 10B illustrates waveform diagrams of relevant signals related to the operation of FIG. 10A.

Please refer to FIG. 10A and FIG. 10B. FIG. 10A shows a schematic circuit diagram of a zero current estimation circuit according to an embodiment of the present invention. FIG. 10B illustrates waveform diagrams of relevant signals related to the operation of FIG. 10A. The zero current estimation circuit 801 of FIG. 10A is one specific embodiment of the zero current estimation circuit 701 of FIG. 9. The configurations of a timer 8012, a ramp circuit 80121, a voltage increasing circuit 80121a, a voltage decreasing circuit 80121b, a comparison circuit 80122 and a NOT gate 80123 shown in FIG. 10A are similar to the embodiment shown in FIG. 7, so the details thereof are not redundantly repeated here. This embodiment shown in FIG. 10A is similar to the embodiment shown in FIG. 7, but is different in that: in this embodiment, the voltage detection circuit 8011 includes two comparators 80111 and 80112. The comparator 80111 is coupled between two ends of the charging inductor L3, whereas, the comparator 80112 is coupled between two ends of the discharging inductor L2. An output end of the comparator 80111 and an output end of the comparator 80112 are coupled to input ends of an OR gate 80113.

In the charging process, when the comparator 80111 detects that the voltage difference (i.e., VL3a−VL3b) between the voltage VL3a at the left side of the charging inductor L3 and the voltage VL3b at the right side of the charging inductor L3 is positive, the comparator 80111 generates a signal having high level, which is inputted to the OR gate 80113; when the comparator 80112 detects that the voltage difference (i.e., VL2a−VL2b) between the voltage VL2a at the left side of the discharging inductor L2 and the voltage VL2b at the right side of the discharging inductor L2 is zero, the comparator 80112 generates a signal having low level, which is inputted to the OR gate 80113. The OR gate 80113 executes an OR operation according to the signal having high level generated by the comparator 80111 and the signal having low level generated by the comparator 80112, so the OR gate 80113 generates the voltage detection signal VD having high level. The high level voltage detection signal VD is inputted to the timer 8012. On the other hand, when the comparator 80111 detects that the voltage difference (i.e., VL3a−VL3b) between the voltage VL3a at the left side of the charging inductor L3 and the voltage VL3b at the right side of the charging inductor L3 is negative, the comparator 80111 generates a signal having low level, which is inputted to the OR gate 80113; when the comparator 80112 detects that the voltage difference (i.e., VL2a−VL2b) between the voltage VL2a at the left side of the discharging inductor L2 and the voltage VL2b at the right side of the discharging inductor L2 is still zero, the comparator 80112 generates a signal having low level, which is inputted to the OR gate 80113. The OR gate 80113 executes an OR operation according to the signal having low level generated by the comparator 80111 and the signal having low level generated by the comparator 80112, so the OR gate 80113 generates the voltage detection signal VD having low level. The low level voltage detection signal VD is inputted to the timer 8012.

In the discharging process, when the comparator 80111 detects that the voltage difference (i.e., VL3a−VL3b) between the voltage VL3a at the left side of the charging inductor L3 and the voltage VL3b at the right side of the charging inductor L3 is zero, the comparator 80111 generates a signal having low level, which is inputted to the OR gate 80113; when the comparator 80112 detects that the voltage difference (i.e., VL2a−VL2b) between the voltage VL2a at the left side of the discharging inductor L2 and the voltage VL2b at the right side of the discharging inductor L2 is positive, the comparator 80112 generates a signal having high level, which is inputted to the OR gate 80113. The OR gate 80113 executes an OR operation according to the signal having low level generated by the comparator 80111 and the signal having high level generated by the comparator 80112, so the OR gate 80113 generates the voltage detection signal VD having high level. The high level voltage detection signal VD is inputted to the timer 8012. On the other hand, when the comparator 80111 detects that the voltage difference (i.e., VL3a−VL3b) between the voltage VL3a at the left side of the charging inductor L3 and the voltage VL3b at the right side of the charging inductor L3 is still zero, the comparator 80111 generates a signal having low level, which is inputted to the OR gate 80113; when the comparator 80112 detects that the voltage difference (i.e., VL2a−VL2b) between the voltage VL2a at the left side of the discharging inductor L2 and the voltage VL2b at the right side of the discharging inductor L2 is negative, the comparator 80112 generates a signal having low level, which is inputted to the OR gate 80113. The OR gate 80113 executes an OR operation according to the signal having low level generated by the comparator 80111 and the signal having low level generated by the comparator 80112, so the OR gate 80113 generates the voltage detection signal VD having low level. The low level voltage detection signal VD is inputted to the timer 8012.

Please refer to FIG. 10B, which illustrates waveform diagrams of relevant signals related to the operation of the zero current estimation circuit in FIG. 10A. A charging inductor current IL3, a charging inductor voltage VL3, a discharging inductor current IL2, a discharging inductor voltage VL2, a voltage detection signal VD, a voltage VT, a zero current estimation signal ZCPD, a charging operation signal GA and a discharging operation signal GB are illustrated and shown in FIG. 10B. As shown in FIG. 10B, a delay period T3 is provided from when the zero current estimation signal ZCPD is generated by the zero current estimation circuit 801; during the delay period T3, the voltage detection signal VD remains at low level, while in the meantime, the charging operation signal GA and the discharging operation signal GB also remain at low level, whereby the first switch S1 remains OFF; the second switch S2 remains ON; the switches Q1-Q10 remains OFF. In one embodiment, at an ending time point of the delay period 13 which starts from when the zero current estimation signal ZCPD is generated by the zero current estimation circuit 801 when the zero current estimation circuit 801 estimates that the charging resonant current IL3 is zero, the discharging operation signal GB is switched to high level, to execute a discharging process. On the other hand, in one embodiment, at an ending time point of the delay period T3 which starts from when the zero current estimation signal ZCPD is generated by the zero current estimation circuit 801 when the zero current estimation circuit 801 estimates that the discharging resonant current IL2 is zero, the charging operation signal GA is switched to high level, to execute a charging process. The delay period T3 is provided for preventing the ON period of the switches Q1-Q10 from overlapping one another. As shown in FIG. 10B, because an absolute value of a rising ramp of the voltage VT is equal to an absolute value of a falling ramp of the voltage VT, the positive voltage period T1 will be equal to the negative voltage period T2.

Figure 11:
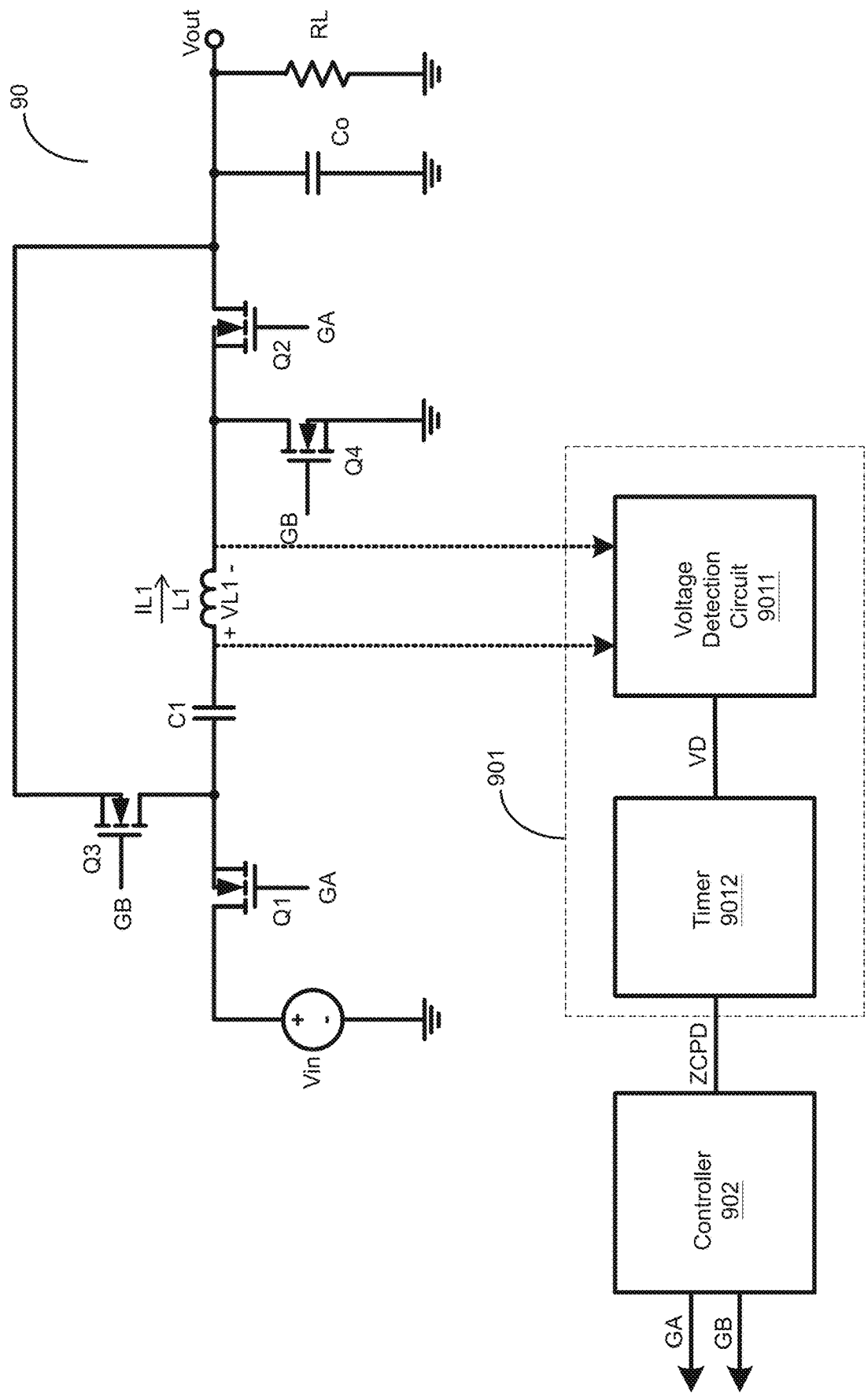
FIG. 11 shows a schematic circuit diagram of a resonant switching power converter according to still another embodiment of the present invention.

Please refer to FIG. 11, which shows a schematic circuit diagram of a resonant switching power converter according to still another embodiment of the present invention. The configurations of a zero current estimation circuit 901, a voltage detection circuit 9011, a timer 9012 and a controller 902 shown in FIG. 11 are similar to the embodiment shown in FIG. 2, so the details thereof are not redundantly repeated here. This embodiment shown in FIG. 11 is similar to the embodiment shown in FIG. 2, but is different in that: in this embodiment, the inductor L1 can be disposed between the capacitor C1 and the switch Q2. The configurations of other devices are similar to the embodiment shown in FIG. 2, so the details thereof are not redundantly repeated here. In one embodiment, the timer 9012 in this embodiment can be implemented as the configuration shown in FIG. 5 or FIG. 6.

Figure 12A:
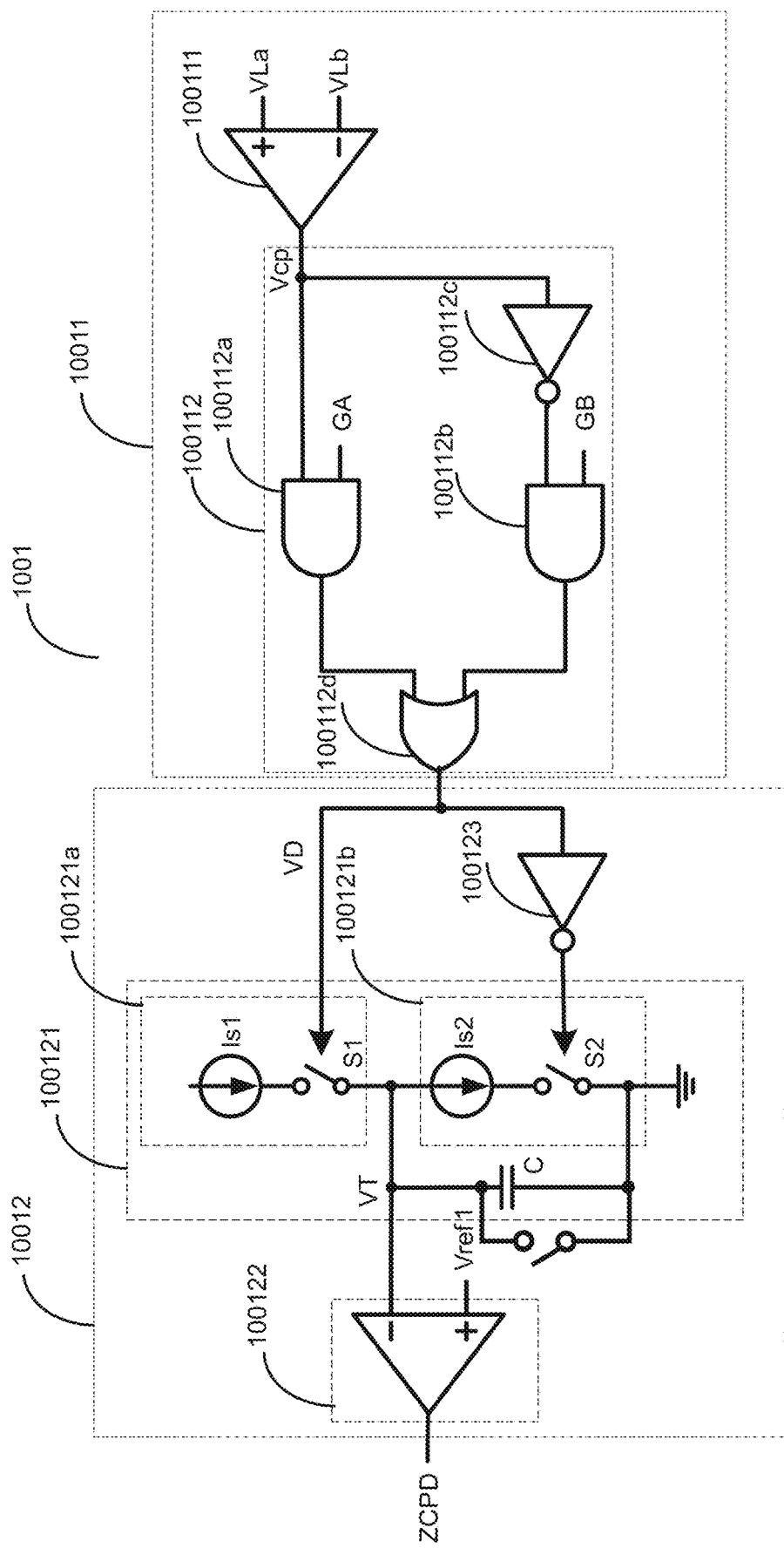
FIG. 12A shows a schematic circuit diagram of a zero current estimation circuit according to an embodiment of the present invention.
Figure 12B:
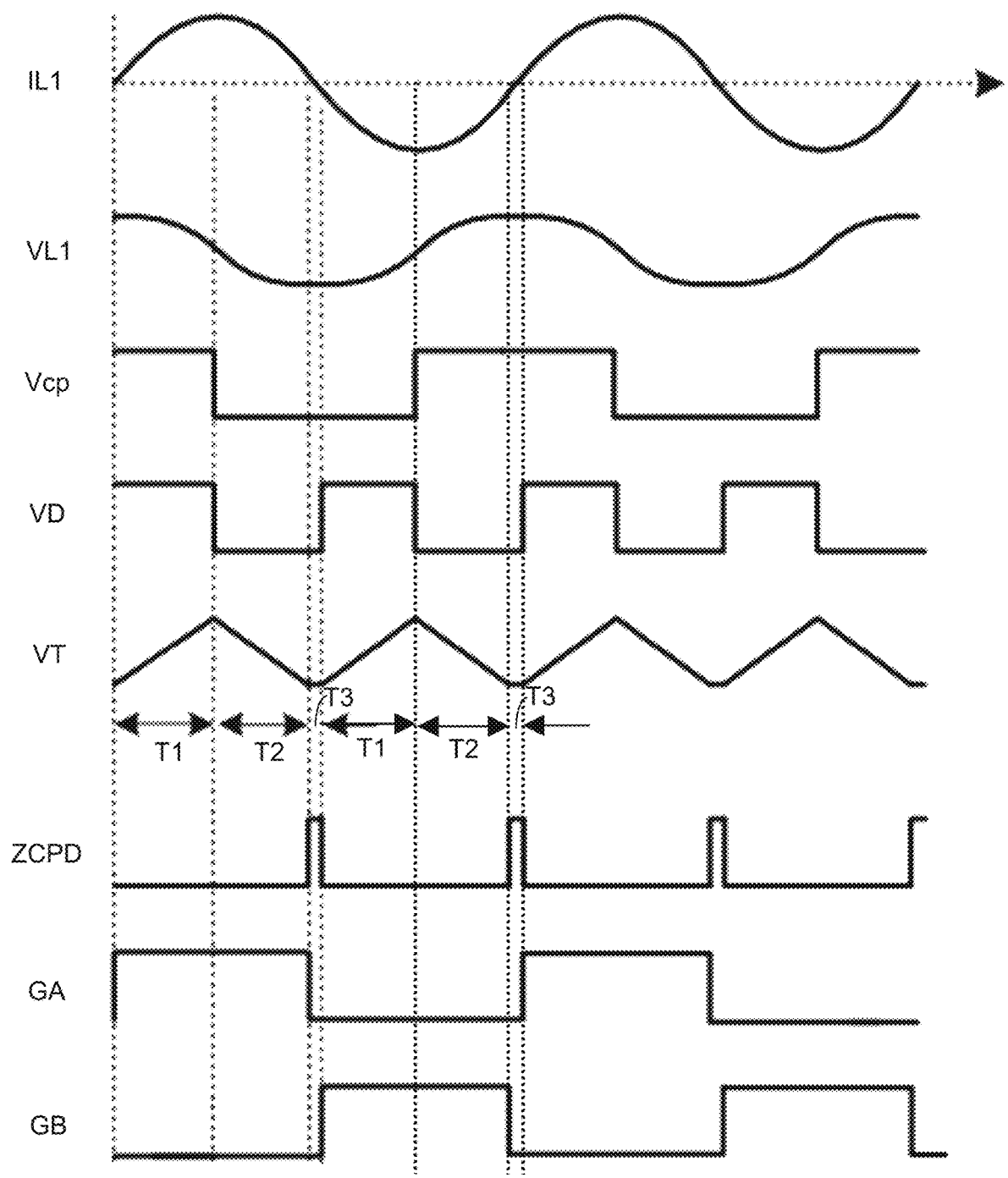
FIG. 12B illustrates waveform diagrams of relevant signals related to the operation of FIG. 12A.

Please refer to FIG. 12A and FIG. 12B. FIG. 12A shows a schematic circuit diagram of a zero current estimation circuit according to an embodiment of the present invention. FIG. 12B illustrates waveform diagrams of relevant signals related to the operation of FIG. 12A. The zero current estimation circuit 1001 of FIG. 12A is an embodiment of the zero current estimation circuit 901 of FIG. 11. The configurations of a timer 10012, a ramp circuit 100121, a voltage increasing circuit 100121a, a voltage decreasing circuit 100121b, a comparison circuit 100122 and a NOT gate 100123 shown in FIG. 12A are similar to the embodiment shown in FIG. 7, so the details thereof are not redundantly repeated here. This embodiment shown in FIG. 12A is similar to the embodiment shown in FIG. 7, but is different in that: in this embodiment, the voltage detection circuit 10011 includes a comparator 100111 and a logic circuit 100112. The logic circuit 100112 for example includes: an AND gate 100112a, an AND gate 100112b, a NOT gate 100112c and an OR gate 100112d. The AND gate 100112a is coupled between the OR gate 100112d and the comparator 100111. The AND gate 100112b is coupled between the OR gate 100112d and the comparator 100111. The NOT gate 100112c is coupled between the comparator 100111 and the AND gate 100112b.

In the charging process, when the comparator 100111 detects that the voltage difference (i.e., VLa−VLb) between the voltage VLa at the left side of the inductor L1 and the voltage VLb at the right side of the inductor L1 is positive, the comparator 100111 generates a signal Vcp having high level, which is inputted to the AND gate 100112a and the NOT gate 100112c. The AND gate 100112a executes an AND operation according to the signal Vcp having high level and the charging operation signal GA received from the controller 902, to generate a high level logic output. Such high level logic output is inputted to the OR gate 100112d. The NOT gate 100112c executes a NOT operation according to the signal Vcp having high level, to generate a low level logic output. Such low level logic output is inputted to the AND gate 100112b. The AND gate 100112b generates a signal having low level according to the low level logic output and the discharging operation signal GB received from the controller 902. Such signal having low level is inputted to the OR gate 100112d. The OR gate 100112d executes an OR operation according to the high level logic output generated by the AND gate 100112a and the low level logic output generated by the AND gate 100112b, to generate a voltage detection signal VD having high level. Such voltage detection signal VD having high level is inputted to the timer 10012. On the other hand, when the comparator 100111 detects that the voltage difference (i.e., VLa−VLb) between the voltage VLa at the left side of the inductor L1 and the voltage VLb at the right side of the inductor L1 is negative, the comparator 100111 generates a signal Vcp having low level, which is inputted to the AND gate 100112a and the NOT gate 100112c. The AND gate 100112a generates a low level logic output according to the signal Vcp having low level and the charging operation signal GA having high level received from the controller 902. Such low level logic output is inputted to the OR gate 100112d. The NOT gate 100112c executes a NOT operation according to the signal Vcp having low level, to generate a high level logic output. Such high level logic output is inputted to the AND gate 100112b. The AND gate 100112b generates a low level logic output according to the high level logic output and the discharging operation signal GB having low level received from the controller 902. Such low level logic output is inputted to the OR gate 100112d. The OR gate 100112d generates a voltage detection signal VD having low level according to the low level logic output generated by the AND gate 100112a and the low level logic output generated by the AND gate 100112b. Such voltage detection signal VD having low level is inputted to the timer 10012.

In the discharging process, when the comparator 100111 detects that the voltage difference (i.e., VLa−VLb) between the voltage VLa at the left side of the inductor L1 and the voltage VLb at the right side of the inductor L1 is negative, the comparator 100111 generates a signal Vcp having low level, which is inputted to the AND gate 100112a and the NOT gate 100112c. The AND gate 100112a generates a low level logic output according to the signal Vcp having low level and the charging operation signal GA having low level received from the controller 902. Such low level logic output is inputted to the OR gate 100112d. The NOT gate 100112c executes a NOT operation according to the signal Vcp having low level, to generate a high level logic output. Such high level logic output is inputted to the AND gate 100112b. The AND gate 100112b executes an AND operation according to the high level logic output and the discharging operation signal GB having high level received from the controller 902, to generate a high level logic output. Such high level logic output is inputted to the OR gate 100112d. The OR gate 100112d executes an OR operation according to the low level logic output generated by the AND gate 100112a and the high level logic output generated by the AND gate 100112b, to generate a voltage detection signal VD having high level. Such voltage detection signal VD having high level is inputted to the timer 10012. On the other hand, when the comparator 100111 detects that the voltage difference (i.e., VLa−VLb) between the voltage VLa at the left side of the inductor L1 and the voltage VLb at the right side of the inductor L1 is positive, the comparator 100111 generates the signal Vcp having high level, which is inputted to the AND gate 100112a and the NOT gate 100112c. The AND gate 100112a generates a low level logic output according to the signal Vcp having high level and the charging operation signal GA having low level received from the controller 902. Such low level logic output is inputted to the OR gate 100112d. The NOT gate 100112c executes the NOT operation according to the signal Vcp having high level, to generate a low level logic output. Such low level logic output is inputted to the AND gate 100112b. The AND gate 100112b generates a low level logic output according to the low level logic output from the NOT gate 100112c and the discharging operation signal GB having high level received from the controller 902. Such low level logic output is inputted to the OR gate 100112d. The OR gate 100112d generates a voltage detection signal VD having low level according to the low level logic output generated by the AND gate 100112a and the low level logic output generated by the AND gate 100112b. Such voltage detection signal VD having low level is inputted to the timer 10012.

Please refer to FIG. 12B, which illustrates waveform diagrams of relevant signals related to the operation of the zero current estimation circuit in FIG. 12A. An inductor current IL1, an inductor voltage VL1, a signal Vcp, a voltage detection signal VD, a voltage VT, a zero current estimation signal ZCPD, a charging operation signal GA and a discharging operation signal GB are illustrated and shown in FIG. 12B. As shown in FIG. 12B, a delay period T3 is provided from when the zero current estimation signal ZCPD is generated by the zero current estimation circuit 1001; during the delay period T3, the voltage detection signal VD remains at low level, while in the meantime, the charging operation signal GA and the discharging operation signal GB also remain at low level, whereby the first switch S1 remains OFF; the second switch S2 remains ON; the switches Q1-Q10 remains OFF. In one embodiment, at an ending time point of the delay period T3 which starts from when the zero current estimation signal ZCPD is generated by the zero current estimation circuit 1001 when the zero current estimation circuit 1001 estimates that the charging resonant current IL1 is zero, the discharging operation signal GB is switched to high level, to execute a discharging process. On the other hand, in one embodiment, at an ending time point of the delay period T3 which starts from when the zero current estimation signal ZCPD is generated by the zero current estimation circuit 1001 when the zero current estimation circuit 1001 estimates that the discharging resonant current IL1 is zero, the charging operation signal GA is switched to high level, to execute a charging process. The delay period T3 is provided for preventing the ON period of the switches Q1-Q10 from overlapping one another. As shown in FIG. 10B, because an absolute value of a rising ramp of the voltage VT is equal to an absolute value of a falling ramp of the voltage VT, the positive voltage period T1 will be equal to the negative voltage period T2.

Figure 13A:
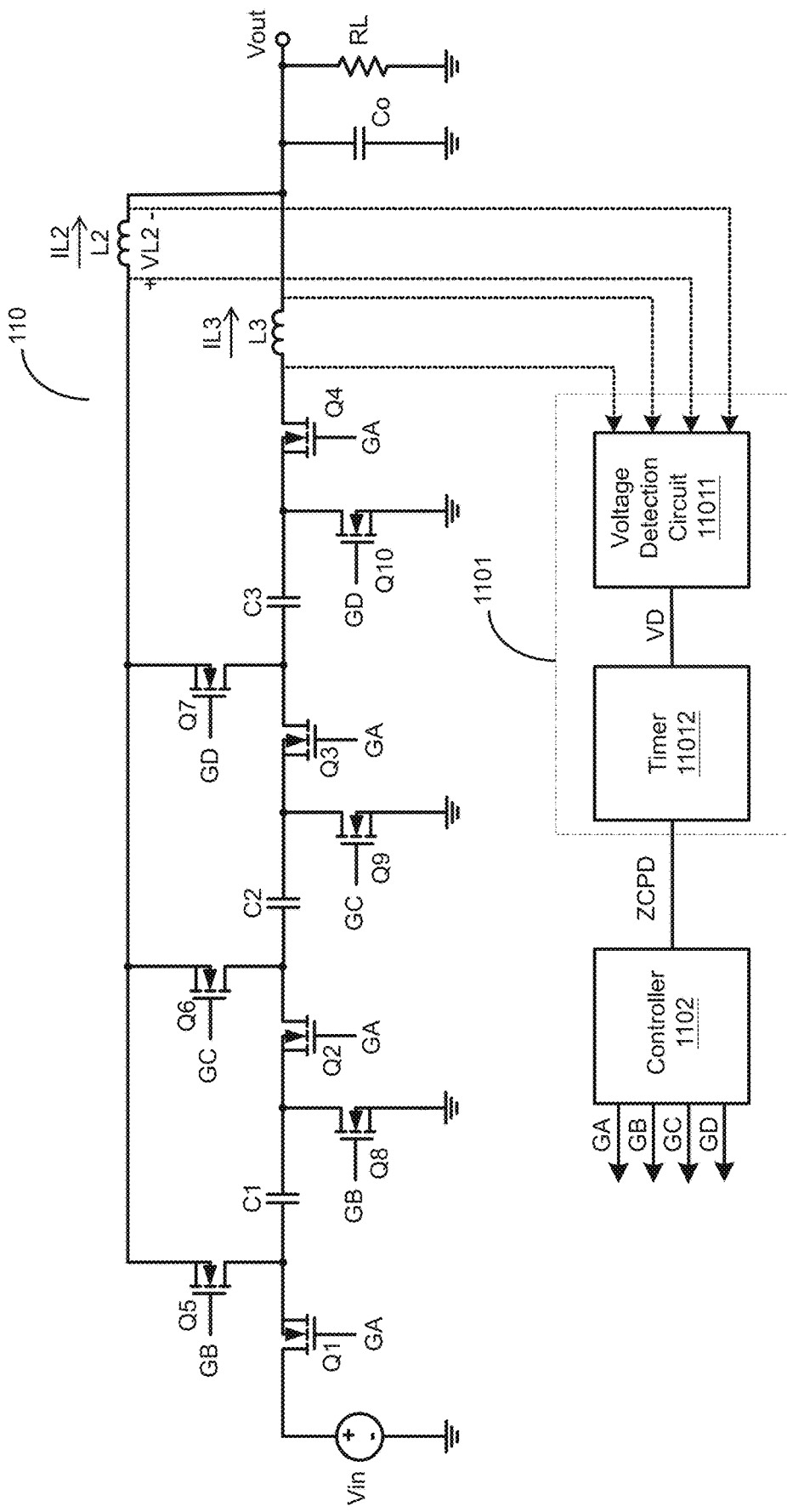
FIG. 13A shows a schematic circuit diagram of a resonant switching power converter according to an embodiment of the present invention.
Figure 13B:
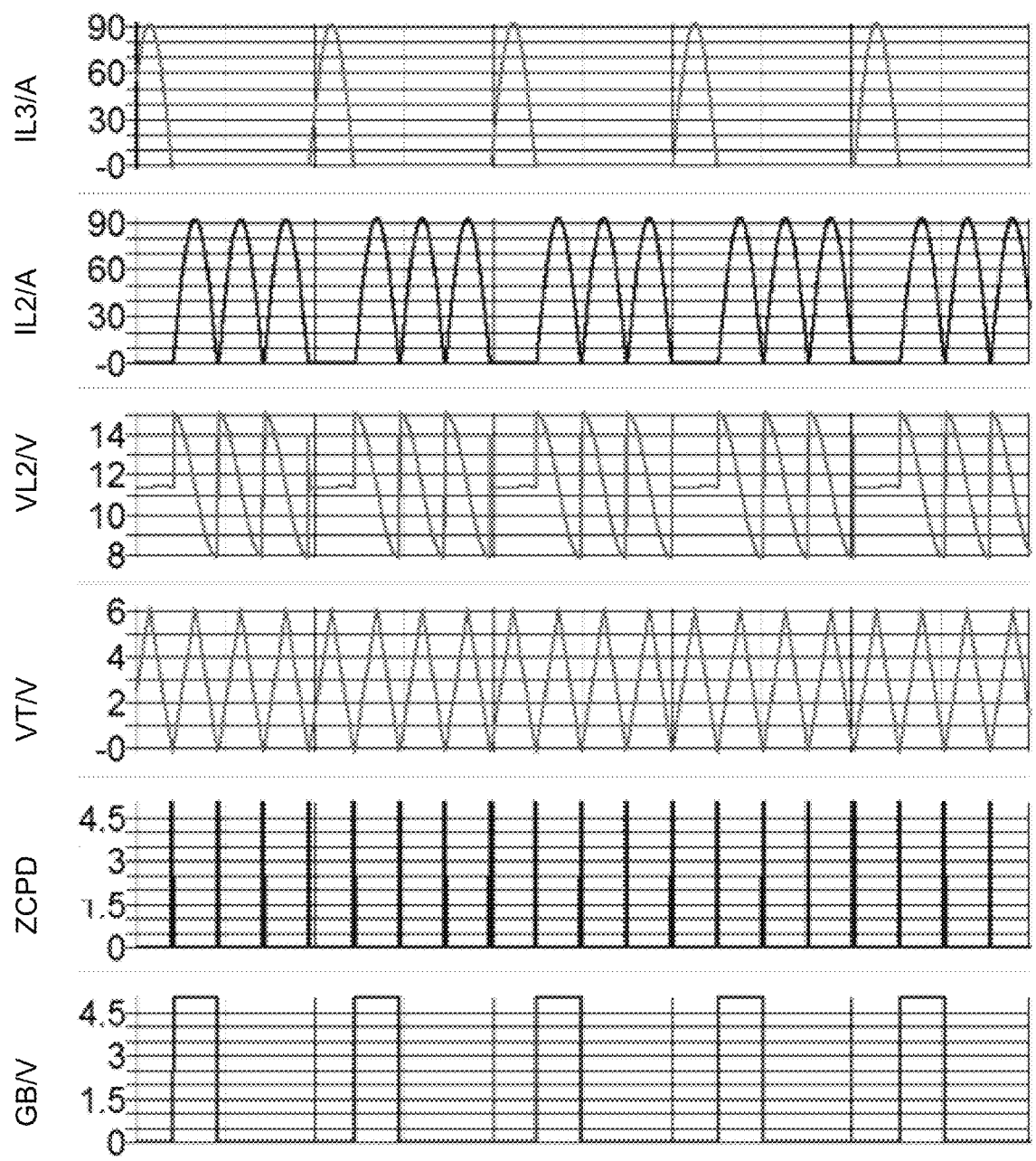
FIG. 13B illustrates waveform diagrams of relevant signals related to the operation of FIG. 13A.

Please refer to FIG. 13A and FIG. 13B. FIG. 13A shows a schematic circuit diagram of a resonant switching power converter according to an embodiment of the present invention. FIG. 13B illustrates waveform diagrams of relevant signals related to the operation of FIG. 13A. The configurations of capacitors C1-C3, a charging inductor L3, a discharging inductor L2, switches Q1-Q10, a zero current estimation circuit 1101, a voltage detection circuit 11011, a timer 11012 and a controller 1102 shown in FIG. 13A are similar to the embodiment shown in FIG. 9, so the details thereof are not redundantly repeated here. This embodiment shown in FIG. 13A is similar to the embodiment shown in FIG. 9, but is different in that: this embodiment includes plural discharging processes, which are executed in sequential order. Besides, the controller 1102 is configured to operably generate a charging operation signal GA corresponding to a charging process and discharging operation signals GB, GC and GD corresponding to plural discharging processes, for operating the switches Q1-Q10 so that the switches Q1-Q10 respectively switch electrical connection relationships of the capacitors C1-C3. The zero current estimation circuit 1101 is coupled to the charging inductor L3 and the discharging inductor L2. The zero current estimation circuit 1101 is configured to operably estimate a time point at which a charging resonant current is zero during the charging process and/or estimate a time point at which a discharging resonant current is zero during the discharging process according to a voltage difference across two ends of the charging inductor L3 and/or a voltage difference across two ends of the discharging inductor L2, so as to correspondingly generate a zero current estimation signal ZCPD. The zero current estimation signal ZCPD is employed to generate the charging operation signal GA and the discharging operation signals GB, GC and GD. In one embodiment, the controller 1102 is configured to operably determine a starting time point and an ending time point of the charging process and a starting time point and an ending time point of the discharging processes according to the zero current estimation signal ZCPD, the charging operation signal GA and/or the discharging operation signals GB, GC and GD. In one embodiment, the timer 11012 in this embodiment can implemented as the configuration shown in FIG. 5, FIG. 6 or FIG. 7.

The switches Q1-Q10 can respectively switch electrical connection relationships between the capacitors C1-C3 and the charging inductor L3 and the discharging inductor L2 according to the charging operation signal GA and the discharging operation signals GB, GC and GD. In one embodiment, the charging operation signal GA and the discharging operation signals GB, GC and GD have respective ON periods which do not overlap one another.

For example, in a charging process, according to the charging operation signal GA, the switches Q1-Q4 are turned ON, whereas, the switches Q5-Q10 are turned OFF, so that a series connection of the capacitors C1-C3 and the charging inductor L3 is formed between the input voltage Vin and the output voltage Vout, to form a charging path. In plural discharging process, according to discharging operation signals GB, GC and GD, respectively, the switches Q5-Q10 are turned ON correspondingly, whereas, the switches Q1-Q4 are turned OFF, so that the capacitors C1, C2 and C3 are respectively connected in series to the discharging inductor L2 in sequential order, to form plural discharging paths. That is, the discharging paths are formed in sequential order in the plural discharging processes. For example, during a first discharging process, according to the discharging operation signal GB, the switches Q5 and Q8 are turned ON, whereas, the switches Q1-Q4, Q6-Q7 and Q9-Q10 are turned OFF, so that a series connection of the capacitor C1 and the discharging inductor L2 is formed between the output voltage Vout and the ground voltage level, to form a first discharging path. During a second discharging process, according to the discharging operation signal GC, the switches Q6 and Q9 are turned ON, whereas, the switches Q1-Q5, Q7, Q8 and Q10 are turned OFF, so that a series connection of the capacitor C2 and the discharging inductor L2 is formed between the output voltage Vout and the ground voltage level, to form a second discharging path. During a third discharging process, according to the discharging operation signal GD, the switches Q7 and Q10 are turned ON, whereas, the switches Q1-Q6 and Q8-Q9 are turned OFF, so that a series connection of the capacitor C3 and the discharging inductor L2 is formed between the output voltage Vout and the ground voltage level, to form a third discharging path.

It is noteworthy that, in one embodiment, the above-mentioned charging process and the above-mentioned first discharging process, second discharging process and third discharging process are arranged at different periods in a repeated, alternating manner, to convert the input voltage Vin to an output voltage Vout; the above-mentioned charging process and the above-mentioned first discharging process, second discharging process and third discharging process are not performed at the same time. That is, after a charging process is performed and ends, a first discharging process follows; a second discharging process follows next, and a third discharging process follows further next, in sequential order. After the third discharging process is performed and ends, another charging process is performed, and so on.

In this embodiment, the DC bias voltages of the capacitors C1, C2 and C3 all have a level of Vo. As a consequence, when the same level of the input voltage and the same level of the output voltage are provided, the capacitors C1, C2 and C3 of this embodiment, as compared to the prior art, will only need to withstand a relatively lower rated voltage. Hence, this embodiment can utilize capacitors having a smaller size.

In one embodiment, the charging resonant frequency of the above-mentioned charging process is the same as the discharging resonant frequency of the above-mentioned discharging process. In one embodiment, the charging resonant frequency of the above-mentioned charging process is different from the discharging resonant frequency of the above-mentioned discharging process. In one embodiment, the above-mentioned resonant switching power converter 110 can be a bidirectional resonant switching power converter. In one embodiment, a voltage conversion ratio of the input voltage Vin to the output voltage Vout of the above-mentioned resonant switching power converter 110 is 4:1, 3:1 or 2:1.

In one embodiment, because the zero current estimation signal ZCPD is generated when a current flowing through the charging inductor L3 or the discharging inductor L2 is approximately zero, which means that the charging operation signal switches its level when a current flowing through the charging inductor L3 or the discharging inductor L2 is approximately zero, the switches Q1-Q4 can be switched at a time point at which the currents flowing through the switches are at a relatively lower level of their respective positive half waves, so that soft switching can be achieved. In one embodiment, zero current switching (ZCS) can be achieved.

In one embodiment, during a charging process, the switches Q1-Q4 can be turned OFF in advance by a predetermined period (i.e., the turned-OFF time point of the switches Q1-Q4 is pulled in by a predetermined period). Because it is a characteristic of the charging inductor L3 to resist dramatic current change, after the switches Q1-Q4 have been turned OFF, a little amount of current remains, which flows through the charging inductor L3 to take away accumulated charges stored in a parasitic capacitor of the switch Q10 via the parasitic diode of the switch Q4, so that the voltage across the switch Q10 can be reduced, thus achieving soft switching. In one embodiment, zero voltage switching (ZVS) can be achieved through adjustment of the predetermined period. In one embodiment, during plural discharging processes, the switches Q7 and Q10 can be turned OFF later by a predetermined period (i.e., the turned-OFF time point of the switches Q7 and Q10 is delayed by a predetermined period). In other words, the switches Q7 and Q10 remains ON during the predetermined period. Thus, during the delayed turned-OFF period of the switches Q7 and Q10 (the delayed turned-OFF period refers to a period before the switches Q7 and Q10 are turned OFF), a discharging current (i.e., a negative current) which reversely flows through the discharging inductor L2 will flow through a parasitic diode of the switch Q5, to charge a parasitic capacitor of the switch Q1. As a result, the voltage across the switch Q1 will be reduced, for achieving soft switching. In one embodiment, zero voltage switching (ZVS) can be achieved through adjustment of the predetermined period by adjusting the zero current threshold.

Please refer to FIG. 13B, which illustrates waveform diagrams of relevant signals related to the operation of the zero current estimation circuit in FIG. 13A. A charging inductor current IL3, a discharging inductor current IL2, a discharging inductor voltage VL2, a voltage VT, a zero current estimation signal ZCPD and a discharging operation signal GB are illustrated and shown in FIG. 13B.

Figure 14:
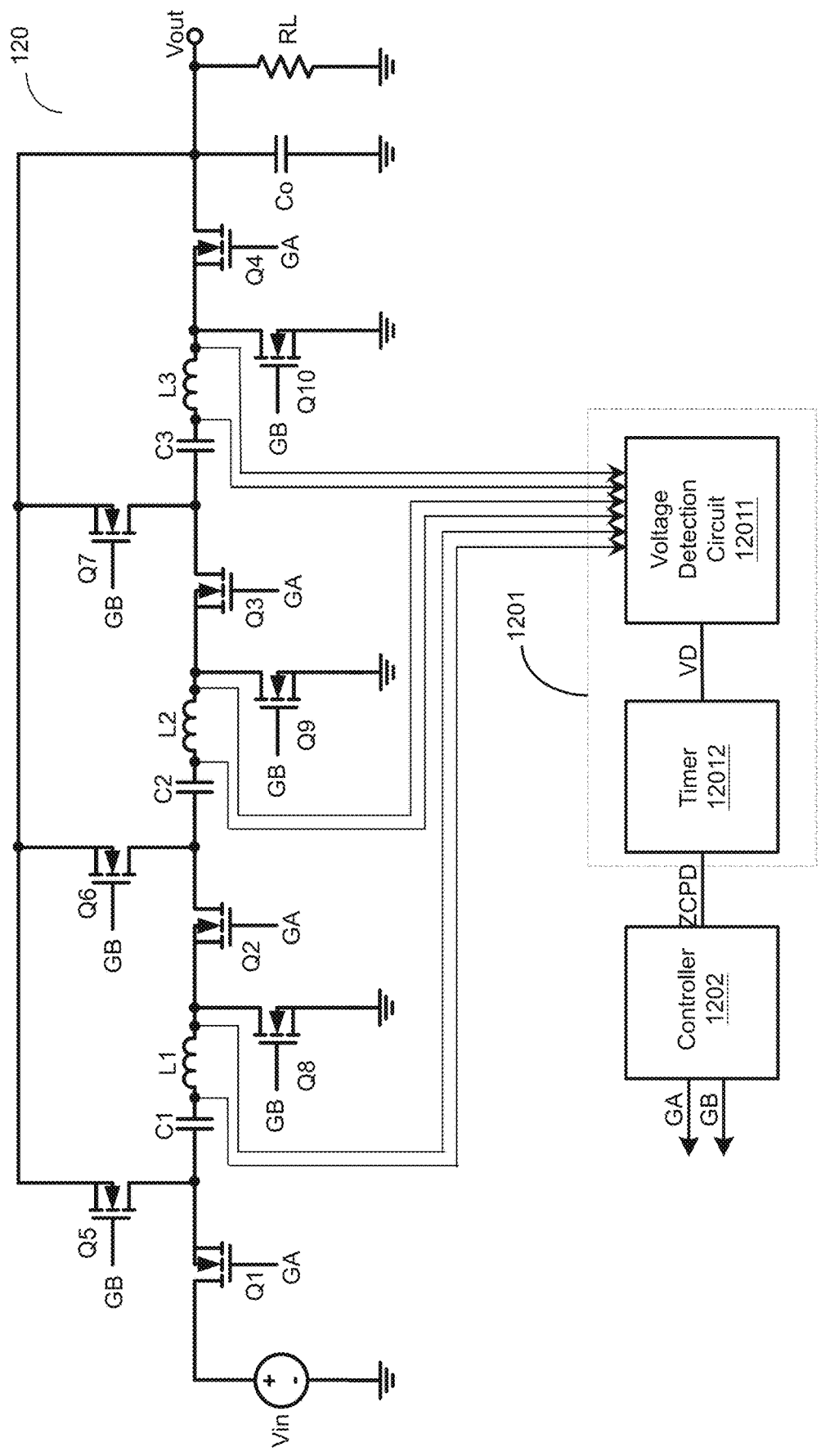
FIG. 14 shows a schematic circuit diagram of a resonant switching power converter according to still another embodiment of the present invention.

Please refer to FIG. 14, which shows a schematic circuit diagram of a resonant switching power converter according to still another embodiment of the present invention. The configurations of a zero current estimation circuit 1201, a voltage detection circuit 12011, a timer 12012 and a controller 1202 shown in FIG. 14 are similar to the embodiment shown in FIG. 2, so the details thereof are not redundantly repeated here. As shown in FIG. 14, a resonant switching power converter 120 of the present invention comprises: capacitors C1, C2 and C3, switches Q1-Q10 and inductors L1-L3. The switches Q1-Q3 are connected in series to the capacitors C1, C2 and C3, respectively. The capacitors C1-C3 are connected in series to the inductors L1-L3. Certainly, it should be understood that the implementation of the number of the capacitors and the number of the inductors of the resonant switching power converter 120 as three in the above-mentioned preferred embodiment is only an illustrative example, but not for limiting the broadest scope of the present invention. In other embodiments, it is also practicable and within the scope of the present invention that the number of the capacitors and the number of the inductors of the resonant switching power converter 120 can be any multiple number other than three. It should be understood that the number of the devices in the above-mentioned preferred embodiment is only an illustrative example, but not for limiting the broadest scope of the present invention. In one embodiment, the timer 12012 in this embodiment can implemented as the configuration shown in FIG. 5, FIG. 6 or FIG. 7.

As shown in FIG. 14, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the inductor L1. One end of the switch Q9 is coupled to a node between the switch Q3 and the inductor L2. One end of the switch Q10 is coupled to a node between the switch Q4 and the inductor L3. As shown in FIG. 14, the other ends of the switches Q5-Q7 are commonly coupled to the output voltage Vout. The other ends of the switches Q8-Q10 are commonly coupled to the ground voltage level. The switch Q4 is coupled between the inductor L3 and the output voltage Vout. The other end of the switch Q1 is coupled to input voltage Vin.

The switches Q1-Q10 can switch electrical connection relationships between the capacitors C1-C3 and the inductors L1-L3 according to the charging operation signal GA and the discharging operation signal GB generated by the controller 1202. In a charging process, according to the charging operation signal GA, the switches Q1-Q4 are ON, whereas, the switches Q5-Q10 are OFF, so that a series connection of the capacitors C1-C3 and the inductors L1-L3 is formed between the input voltage Vin and the output voltage Vout, to form a charging path. In a discharging process, according to discharging operation signal GB, the switches Q5-Q10 are ON, whereas, the switches Q1-Q4 are OFF, so that a series connection of the capacitor C1 and the inductor L1 is formed between the output voltage Vout and the ground voltage level; a series connection of the capacitor C2 and the inductor L2 is formed between the output voltage Vout and the ground voltage level; a series connection of the capacitor C3 and the inductor L3 is formed between the output voltage Vout and the ground voltage level, to form plural discharging paths. It is noteworthy that, in one embodiment, the above-mentioned charging process and the above-mentioned discharging process are arranged at different periods in a repeated, alternating manner. The above-mentioned charging process and the above-mentioned plural discharging processes are not performed at the same time. In one embodiment, the charging process and the plural discharging processes are arranged in a repeated, alternating manner, so as to convert the input voltage Vin to the output voltage Vout. In this embodiment, the DC bias voltages of the capacitors C1, C2 and C3 all have a level of Vo. As a consequence, the capacitors C1, C2 and C3 of this embodiment, as compared to the prior art, will only need to withstand a relatively lower rated voltage. Hence, this embodiment can utilize capacitors having a smaller size.

In one embodiment, because the zero current estimation signal ZCPD is generated when a current flowing through the charging inductor L3 or the discharging inductor L2 is approximately zero, which means that the charging operation signal switches its level when a current flowing through the charging inductor L3 or the discharging inductor L2 is approximately zero, the switches Q1-Q4 can be switched at a time point at which the currents flowing through the switches are at a relatively lower level of their respective positive half waves, so that soft switching can be achieved. In one embodiment, zero current switching (ZCS) can be achieved.

In one embodiment, the above-mentioned charging process has a charging resonant frequency, whereas, the above-mentioned plural discharging processes have a discharging resonant frequency. In one embodiment, the charging resonant frequency is the same as the discharging resonant frequency.

Figure 15A:
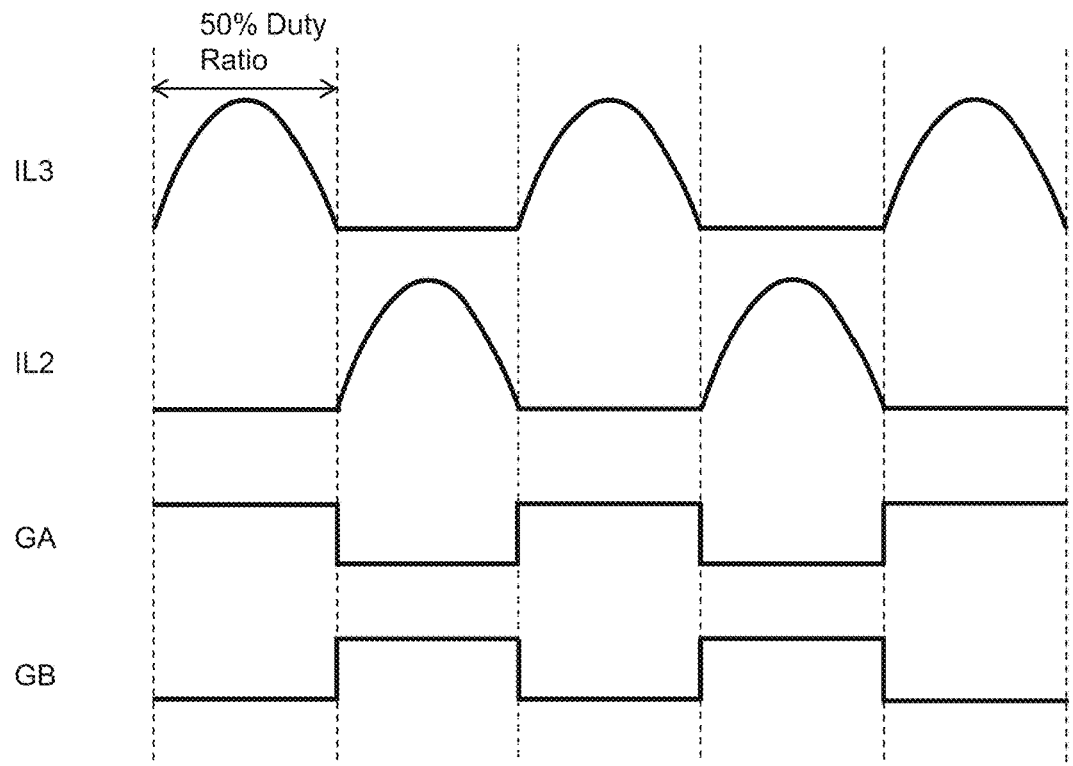
FIG. 15A, FIG. 15B and FIG. 15C illustrate waveform diagrams of operation signals and inductor currents to a charging process and discharging processes.

Please refer to FIG. 15A, which illustrates waveform diagrams of operation signals and inductor currents to a charging process and discharging processes. Please refer to FIG. 15A in conjugation with FIG. 9. In the embodiment shown in FIG. 15A, the charging operation signal GA corresponding to the switches Q1-Q4 are at high level in the charging process, whereas, the discharging operation signal GB corresponding to the switches Q5-Q10 are at high level in the discharging process. In the embodiment shown FIG. 15A, because the zero current estimation signal ZCPD is generated when a current flowing through the charging inductor L3 or the discharging inductor L2 is approximately zero, which means that the charging operation signal switches its level when a current flowing through the charging inductor L3 or the discharging inductor L2 is approximately zero, the switches Q1-Q4 can be switched at a time point at which the currents flowing through the switches are at a relatively lower level of their respective positive half waves, so that soft switching can be achieved. In one embodiment, zero current switching (ZCS) can be achieved.

Figure 15B:
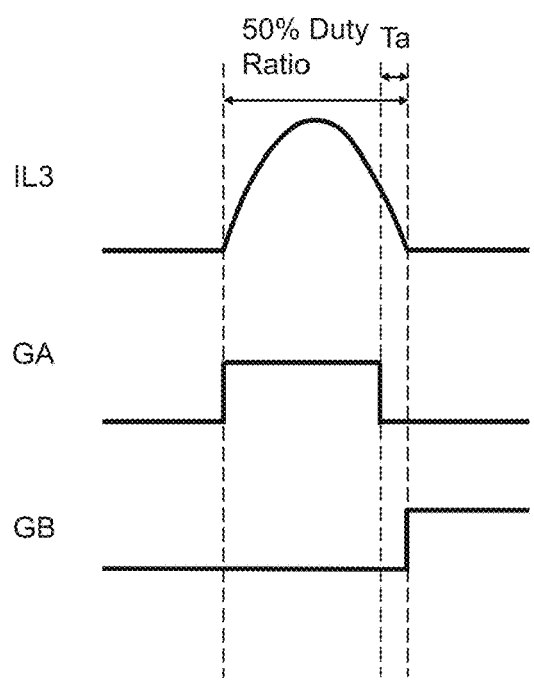
Figure 15C:
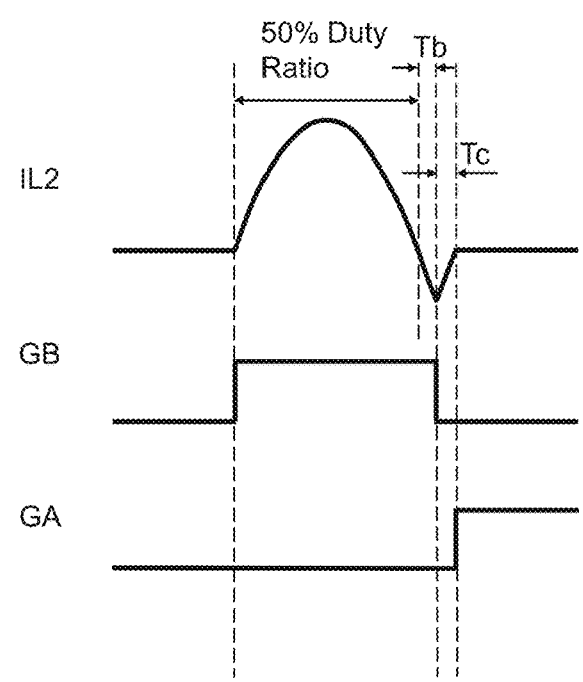

Please refer to FIG. 15B and FIG. 15C, which illustrate waveform diagrams of operation signals and inductor currents to a charging process and discharging processes. Please refer to FIG. 15B in conjugation with FIG. 9. In the embodiment shown in FIG. 15B, the charging operation signal GA corresponding to the switches Q1-Q4 are at high level in the charging process, whereas, the discharging operation signal GB corresponding to the switches Q5-Q10 are at high level in the discharging process. In the embodiment shown in FIG. 15B, the duration period of the charging process is substantially smaller than 50% of the cycle period by a predetermined period Ta. As a result, after the switches Q1-Q4 have been turned OFF, a little amount of current remains, which flows through the charging inductor L3 to take away accumulated charges stored in a parasitic capacitor of the switch Q10 via the parasitic diode of the switch Q4, so that the voltage across the switch Q10 can be reduced, thus achieving soft switching. In one embodiment, zero voltage switching (ZVS) can be achieved through adjustment of the predetermined period Ta. Please refer to FIG. 15C in conjugation with FIG. 9. In the embodiment shown in FIG. 15C, the charging operation signal GA corresponding to the switches Q1-Q4 are at high level in the charging process, whereas, the discharging operation signal GB corresponding to the switches Q5-Q10 are at high level in the discharging process. In the embodiment shown in FIG. 15C, the duration period of the discharging process is greater than 50% of the cycle period by a predetermined period Tb. Thus, during the delayed turned-OFF period of the switches Q5-Q10, a negative current of the discharging inductor L2 will flow through a parasitic diode of the switch Q5, to charge a parasitic capacitor of the switch Q1. As a result, the voltage across the switch Q1 will be reduced, for achieving soft switching. In one embodiment, zero voltage switching (ZVS) can be achieved through adjustment of the predetermined period Tb. It is noteworthy that, in one embodiment, the embodiment of FIG. 15B and the embodiment of FIG. 15C can be implemented together or alone.

Figure 16:
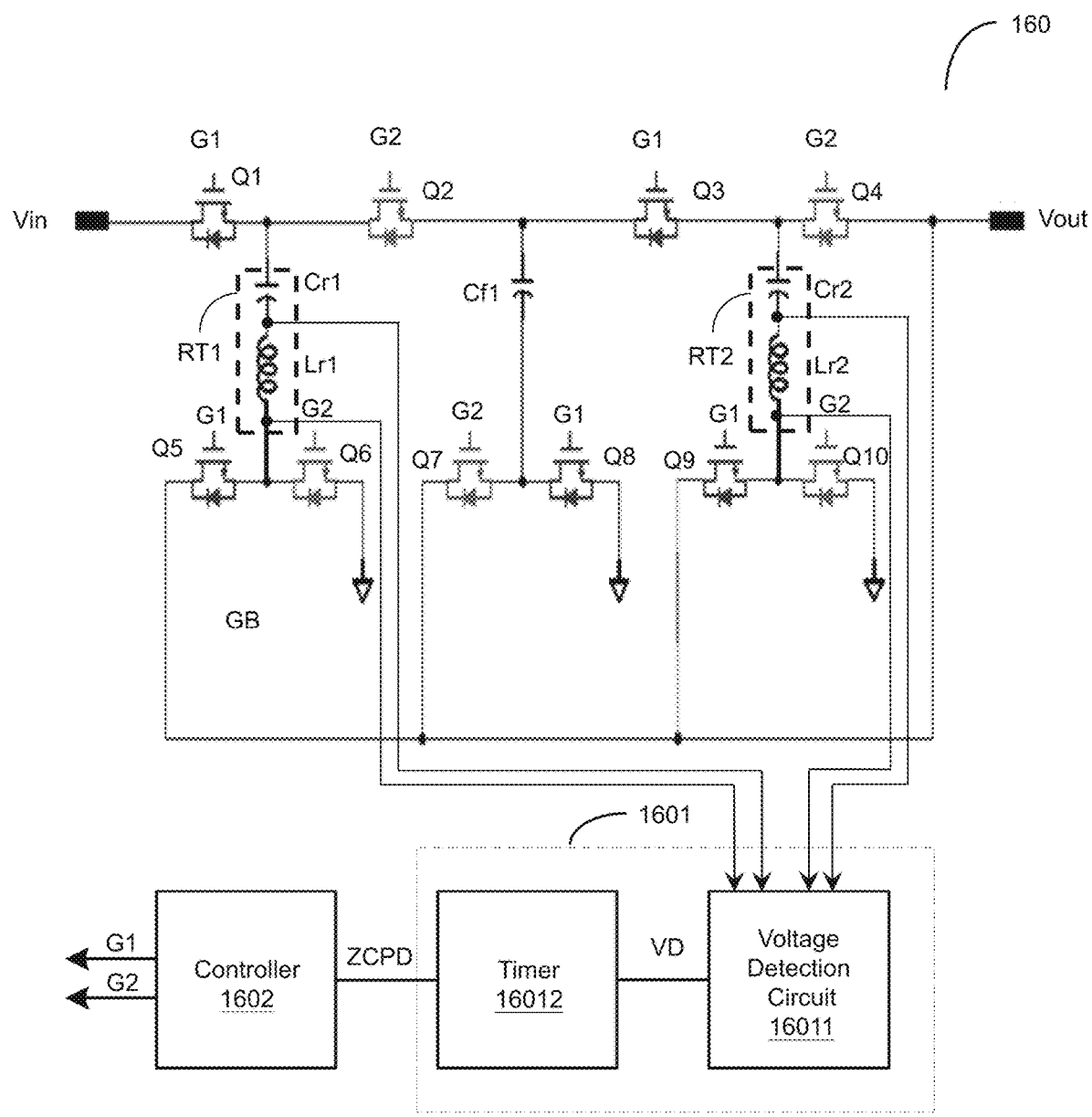
FIG. 16 shows a schematic circuit diagram of a resonant switching power converter according to still another embodiment of the present invention.

Please refer to FIG. 16, which shows a schematic circuit diagram of a resonant switching power converter according to still another embodiment of the present invention. In this embodiment, a resonant switching power converter 160 is configured to operably convert an input voltage Vin to an output voltage Vout. The resonant switching power converter 160 comprises: a resonator RT1, a resonator RT2, switches Q1-Q10, a non-resonant capacitor Cf1, a zero current estimation circuit 1601 and a controller 1602.

The resonator RT1 includes a resonant capacitor Cr1 and a resonant inductor Lr1 which are connected in series to each other. The resonator RT2 includes a resonant capacitor Cr2 and a resonant inductor Lr2 which are connected in series to each other. The switches Q1-Q10 are coupled to the resonator RT1 and resonator RT2. The switches Q1-Q10 are configured to operably switch electrical connection relationships of the resonator RT1 and resonator RT2 according to a first resonant operation signal G1 and a second resonant operation signal G2 in a first resonant process and a second resonant process.

The electrical connection relationships between the non-resonant capacitor Cf1 with the resonator RT1 and the resonator RT2 are controlled according to the first resonant operation signal G1 and the second resonant operation signal G2, and the voltage across the non-resonant capacitor Cf1 is kept at a constant ratio to the input voltage Vin; in this embodiment, this constant ratio of the voltages across the non-resonant capacitor Cf1 to the input voltage Vin is for example 1:2. The zero current estimation circuit 1601 is coupled to the resonant inductor Lr1 of the resonator RT1 and the resonant inductor Lr2 of the resonator RT2. The zero current estimation circuit 1601 is configured to operably estimate a time point at which a first resonant current flowing through the resonant inductor Lr1 or the resonant inductor Lr2 is zero during a first resonant process and/or estimate a time point at which a second resonant current flowing through the resonant inductor Lr1 or the resonant inductor Lr2 is zero during a second resonant process according to a voltage difference across two ends of the resonant inductor Lr1 and a voltage difference across two ends of the resonant inductor Lr2, so as to correspondingly generate a zero current estimation signal ZCPD. The zero current estimation signal ZCPD is employed to generate the first resonant operation signal G1 and the second resonant operation signal G2. The first resonant operation signal G1 and the second resonant operation signal G2 have respective ON periods which do not overlap one another, so that the first resonant process and the second resonant process do not overlap each other. The first resonant process and the second resonant process are arranged in a repeated, alternating manner, so as to convert the input voltage Vin to the output voltage Vout.

The mechanism as to how a resonator such as the resonator RT1 and the resonator RT2 of the resonant switching power converter 160 operates is well known to those skilled in the art, so the details thereof are not redundantly explained here. The configuration of the zero current estimation circuit 1601 shown in FIG. 16 can be implemented similarly to the zero current estimation circuit shown in FIG. 7, FIG. 10A or FIG. 12A. Besides, the configuration of a timer 8012 shown in FIG. 16 can be implemented similarly to the timer shown in FIG. 5.

The controller 1602 is coupled to the zero current estimation circuit 1601. The controller 1602 is configured to operably generate the first resonant operation signal G1 and the second resonant operation signal G2 according to the zero current estimation signal ZCPD, for controlling the switches Q1-Q10. In one embodiment, the controller 1602 is configured to operably determine a starting time point and an ending time point of the first resonant process and a starting time point and an ending time point of the second resonant process according to the zero current estimation signal ZCPD, the first resonant operation signal G1 and/or the second resonant operation signal G2.

The present invention provides a resonant switching power converter as described above. Advantages of the present invention include: that the present invention can reduce inrush current; that the present invention can estimate zero current timing by a voltage across the inductor or capacitor, so as to achieve zero current switching (ZCS) or zero voltage switching (ZVS) to improve power conversion efficiency without using a current sensing resistor or current sensing transformer; that the present invention can reduce power consumption caused by high current flowing through a current sensing resistor; that the present invention can solve the inaccuracy problem of a large size current sensing resistor sensing a low current.

It should be understood that "high level" and "low level" mentioned in the above embodiments are only for illustration, but not for limiting the scope of the present invention. In other embodiments, based on the type of switches and the required logic operation, the above-mentioned "high level" and "low level" may be modified as required, under the spirit of the present invention.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a part of another embodiment. In view of the foregoing, the spirit of the present invention should cover all such and other modifications and variations, which should be interpreted to fall within the scope of the following claims and their equivalents.

What is claimed is:

1. A resonant switching power converter, which is configured to operably convert an input voltage to an output voltage; the resonant switching power converter comprising:
   at least one capacitor;
   a plurality of switches, which are coupled to the at least one capacitor, wherein the plurality of switches are configured to operably switch electrical connection relationships of the at least one capacitor according to an operation signal;
   at least one charging inductor, which is connected in series to one of the at least one capacitor;
   at least one discharging inductor, which is connected in series to one of the at least one capacitor; and
   a zero current estimation circuit, which is coupled to one or more of (1)-(3): (1) the at least one charging inductor, (2) the at least one discharging inductor, and (3) the at least one capacitor, wherein the zero current estimation circuit is configured to operably estimate a time point at which a charging resonant current is zero during a charging process and/or estimate a time point at which a discharging resonant current is zero during at least one discharging process according to one or more of (a)-(c): (a) a voltage difference across two ends of the at least one charging inductor, (b) a voltage difference across two ends of the at least one discharging inductor, and (c) a voltage difference across two ends of the at least one capacitor, so as to generate a zero current estimation signal, wherein the operation signal is generated according to the zero current estimation signal;
   wherein the operation signal includes a charging operation signal and at least one discharging operation signal, wherein the charging operation signal and the at least one discharging operation signal have respective ON periods which do not overlap one another, so that the charging process and the at least one discharging process do not overlap each other;
   wherein in the charging process, the charging operation signal is configured to operably control the switching of the plurality of switches, so that a series connection of the at least one capacitor and the at least one charging inductor is formed between the input voltage and the output voltage, to form a charging path, whereby a resonant charging operation is performed on the at least one capacitor and the at least one charging inductor;
   wherein in the at least one discharging process, the at least one discharging operation signal is configured to operably control the switching of the plurality of switches, so that a series connection of each respective capacitor and one of the at least one discharging inductor is formed between the output voltage and a ground voltage level, to simultaneously or sequentially forms a plurality of discharging paths, whereby a resonant discharging operation is performed on the at least one capacitor and the at least one discharging inductor;
   wherein the charging process and the at least one discharging processes are arranged in a repeated, alternating manner, so as to convert the input voltage to the output voltage.

2. The resonant switching power converter of claim 1, wherein the zero current estimation circuit includes:
   a voltage detection circuit, which is configured to operably generate a voltage detection signal according to the voltage difference across the two ends of the at least one charging inductor and/or the voltage difference across the two ends of the at least one discharging inductor, wherein the voltage detection signal is indicative of a positive voltage period wherein the voltage difference across two ends of the at least one charging inductor and/or the voltage difference across two ends of the at least one discharging inductor is above zero voltage; and
a timer, which is coupled to an output end of the voltage detection circuit and which is configured to operably generate the zero current estimation signal according to the voltage detection signal.

3. The resonant switching power converter of claim 1, wherein the zero current estimation circuit includes:
a voltage detection circuit, which is configured to operably generate a voltage detection signal according to the voltage difference across two ends of the at least one capacitor, wherein the voltage detection signal is indicative of an occurrence time point of a peak of the voltage difference across the two ends of the at least one capacitor and an occurrence time point of a valley of the voltage difference across the two ends of the at least one capacitor, and wherein the zero current estimation signal is generated according to the voltage detection signal.

4. The resonant switching power converter of claim 2, wherein the timer includes:
a ramp circuit, which is configured to operably generate a rising ramp of a ramp signal according to the voltage detection signal during the positive voltage period, and to operably generate a falling ramp of the ramp signal according to the rising ramp after the positive voltage period ends; and
a comparison circuit, which is configured to operably compare the ramp signal with a zero current threshold, so as to generate the zero current estimation signal for determining a starting time point and an ending time point of the charging process and a starting time point and an ending time point of the at least one discharging processes.

5. The resonant switching power converter of claim 4, wherein the ramp circuit includes:
a voltage increasing circuit, which is configured to operably increase a voltage across a ramp capacitor from zero during the positive voltage period, so as to generate the rising ramp; and
a voltage decreasing circuit, which is configured to operably decrease the voltage across the ramp capacitor after the positive voltage period ends, so as to generate the falling ramp;
wherein an absolute value of the slope of the rising ramp is the same as an absolute value of the slope of the falling ramp.

6. The resonant switching power converter of claim 5, wherein the voltage increasing circuit includes:
a first switch; and
a first current source;
wherein the first switch is configured to operably conduct the first current source to charge the ramp capacitor according to the voltage detection signal during the positive voltage period.

7. The resonant switching power converter of claim 6, wherein the voltage decreasing circuit includes:
a second switch; and
a second current source;
wherein the second switch is configured to operably conduct the second current source to discharge the ramp capacitor after the positive voltage period ends.

8. The resonant switching power converter of claim 1, further comprising:
a controller, which is coupled to the zero current estimation circuit, wherein the controller is configured to operably generate the charging operation signal and the at least one discharging operation signal according to the zero current estimation signal.

9. The resonant switching power converter of claim 8, wherein the controller includes:
a delay circuit, which is configured to operably cause the zero current estimation signal to maintain for a delay period, so that the charging process and the at least one discharging processes are separated from each other by the delay period.

10. The resonant switching power converter of claim 2, wherein the voltage detection circuit includes:
at least one comparator, which is configured to operably compare a voltage at one end of the at least one charging inductor with a voltage at the other end of the at least one charging inductor and/or compare a voltage at one end of the at least one discharging inductor with a voltage at the other end of the at least one discharging inductor.

11. The resonant switching power converter of claim 10, wherein the at least one comparator includes two comparators, and wherein one of the two comparators is coupled to the two ends of the at least one charging inductor, whereas, the other of the two comparators is coupled to the two ends of the at least one discharging inductor.

12. The resonant switching power converter of claim 5, wherein the timer further includes:
a reset switch, which is connected in parallel to the ramp capacitor, wherein the reset switch is configured to operably discharge the voltage across the ramp capacitor to zero voltage after the zero current estimation signal is generated.

13. The resonant switching power converter of claim 9, wherein during the delay period, the plurality of switches are kept OFF.

14. The resonant switching power converter of claim 1, wherein the at least one charging inductor is one single charging inductor and the at least one discharging inductor is one single discharging inductor.

15. The resonant switching power converter of claim 1, wherein the at least one charging inductor and the at least one discharging inductor is one same single inductor.

16. The resonant switching power converter of claim 1, wherein the charging process has a charging resonant frequency, whereas, the discharging process has a discharging resonant frequency, and wherein the charging resonant frequency is the same as the discharging resonant frequency.

17. The resonant switching power converter of claim 1, wherein the charging process has a charging resonant frequency, whereas, the discharging process has a discharging resonant frequency, and wherein the charging resonant frequency is different from the discharging resonant frequency.

18. The resonant switching power converter of claim 4, wherein the timer adjusts a level to the zero current threshold to shorten or prolong the ON period for a zero voltage period, so as to achieve zero voltage switching of the plurality of switches.

19. The resonant switching power converter of claim 1, wherein the resonant switching power converter is a bidirectional resonant switching power converter.

20. The resonant switching power converter of claim 1, wherein a voltage conversion ratio of the input voltage to the output voltage of the resonant switching power converter is 4:1, 3:1 or 2:1.

21. The resonant switching power converter of claim 2, wherein the timer includes:
a counter circuit; and
a determination circuit;
wherein when the voltage detection signal is switched from low level to high level, the counter circuit starts counting according to a clock signal and outputs a counting result to the determination circuit, and wherein when the voltage detection signal is switched from high level to low level, the counter circuit counts down from a last counting result according to the clock signal; wherein when the counter circuit counts down to zero or a counting threshold, the determination circuit generates the zero current estimation signal.

22. The resonant switching power converter of claim 21, wherein after the determination circuit generates the zero current estimation signal, the determination circuit outputs a reset signal to the counter circuit, so as to reset the counter circuit.

23. A resonant switching power converter, which is configured to operably convert an input voltage to an output voltage; the resonant switching power converter comprising:
at least one resonator, wherein the at least one resonator includes a resonant capacitor and a resonant inductor which are connected in series to each other;
a plurality of switches, which are coupled to the at least one resonator, wherein the plurality of switches are configured to operably switch electrical connection relationships of the at least one resonator according to a first resonant operation signal and a second resonant operation signal in correspondence to a first resonant process and a second resonant process, respectively; wherein in the first resonant process, a resonant charging operation is performed on the at least one resonator, and wherein in a second resonant process, a resonant discharging operation is performed on the at least one resonator;
at least one non-resonant capacitor, whose electrical connection relationship with the at least one resonator is controlled according to the first resonant operation signal and the second resonant operation signal, wherein a voltage across the at least one non-resonant capacitor has a constant ratio to the input voltage; and
a zero current estimation circuit, which is coupled to the resonant inductor of the at least one resonator, wherein the zero current estimation circuit is configured to operably estimate a time point at which a first resonant current flowing through the resonant inductor is zero during a first resonant process and/or estimate a time point at which a second resonant current flowing through the resonant inductor is zero during a second resonant process according to a voltage difference across two ends of the resonant inductor, so as to correspondingly generate a zero current estimation signal; wherein the zero current estimation signal is for generating the first resonant operation signal and the second resonant operation signal;
wherein the first resonant operation signal and the second resonant operation signal have respective ON periods do not overlap one another, so that the first resonant process and the second resonant process do not overlap each other;
wherein the first resonant process and the second resonant process are arranged in a repeated, alternating manner, so as to convert the input voltage to the output voltage.

24. The resonant switching power converter of claim 23, wherein the zero current estimation circuit includes:
a voltage detection circuit, which is configured to operably generate a voltage detection signal according to the voltage difference across the two ends of the at least one resonator, wherein the voltage detection signal is indicative of a positive voltage period wherein the voltage difference across the two ends of the at least one resonator is above zero voltage; and
a timer, which is coupled to an output end of the voltage detection circuit and which is configured to operably generate the zero current estimation signal according to the voltage detection signal.

25. The resonant switching power converter of claim 24, wherein the timer includes:
a ramp circuit, which is configured to operably generate a rising ramp of a ramp signal according to the voltage detection signal during the positive voltage period, and to operably generate a falling ramp of the ramp signal according to the rising ramp after the positive voltage period ends; and
a comparison circuit, which is configured to operably compare the ramp signal with a zero current threshold, so as to generate the zero current estimation signal for determining a starting time point and an ending time point of the charging process and a starting time point and an ending time point of the at least one discharging processes.

26. The resonant switching power converter of claim 25, wherein the ramp circuit includes:
a voltage increasing circuit, which is configured to operably increase a voltage across a ramp capacitor from zero during the positive voltage period, so as to generate the rising ramp; and
a voltage decreasing circuit, which is configured to operably decrease the voltage across the ramp capacitor after the positive voltage period ends, so as to generate the falling ramp;
wherein an absolute value of the slope of the rising ramp is the same as an absolute value of the slope of the falling ramp.

27. The resonant switching power converter of claim 26, wherein the voltage increasing circuit includes:
a first switch; and
a first current source;
wherein the first switch is configured to operably conduct the first current source to charge the ramp capacitor according to the voltage detection signal during the positive voltage period.

28. The resonant switching power converter of claim 27, wherein the voltage decreasing circuit includes:
a second switch; and
a second current source;
wherein the second switch is configured to operably conduct the second current source to discharge the ramp capacitor after the positive voltage period ends.

29. The resonant switching power converter of claim 23, further comprising:
a controller, which is coupled to the zero current estimation circuit, wherein the controller is configured to operably generate the first resonant operation signal and the second resonant operation signal according to the zero current estimation signal.

30. The resonant switching power converter of claim 29, wherein the controller includes:
   a delay circuit, which is configured to operably cause the zero current estimation signal to maintain for a delay period, so that the first resonant process and the second resonant process are separated from each other by the delay period.

* * * * *